(12) United States Patent
McCoy et al.

(10) Patent No.: US 11,351,443 B2
(45) Date of Patent: Jun. 7, 2022

(54) ELECTROMAGNETIC GAME BOARD

(71) Applicant: Sony Interactive Entertainment Inc., Tokyo (JP)

(72) Inventors: Charles McCoy, San Mateo, CA (US); True Xiong, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 138 days.

(21) Appl. No.: 16/943,375

(22) Filed: Jul. 30, 2020

(65) Prior Publication Data
US 2022/0032167 A1 Feb. 3, 2022

(51) Int. Cl.
*A63F 3/00* (2006.01)

(52) U.S. Cl.
CPC ...... *A63F 3/00574* (2013.01); *A63F 3/00261* (2013.01); *A63F 3/00643* (2013.01); *A63F 3/00694* (2013.01); *A63F 2003/0063* (2013.01); *A63F 2003/00264* (2013.01)

(58) Field of Classification Search
CPC .............. A63F 3/00574; A63F 3/00261; A63F 3/00643; A63F 3/00694; A63F 2003/00264; A63F 2003/0063
USPC .......................................................... 463/14
See application file for complete search history.

(56) References Cited

U.S. PATENT DOCUMENTS

| | | | |
|---|---|---|---|
| 2,302,333 A * | 11/1942 | Linke .................... | A63F 9/0406 273/138.2 |
| 4,211,411 A * | 7/1980 | McDaniel ............. | A63F 7/0058 273/239 |
| 4,398,720 A * | 8/1983 | Jones ................... | A63F 3/00895 901/6 |
| 5,040,800 A * | 8/1991 | Ulan .................... | A63F 3/00574 273/288 |
| 5,848,788 A * | 12/1998 | Hess .................... | A63F 3/00643 273/239 |
| 8,602,857 B2 * | 12/2013 | Morichau-Beauchant ................. A63F 3/00643 463/9 |
| 9,240,268 B2 * | 1/2016 | Smoot .................... | H01H 47/00 |
| 10,857,450 B1 * | 12/2020 | Aman .................... | A63F 13/213 |
| 11,117,046 B1 * | 9/2021 | Denbigh ............. | A63F 3/00261 |
| 2004/0166915 A1 | 8/2004 | Robarge | |
| 2005/0077678 A1 * | 4/2005 | Bibi ..................... | A63F 3/00895 273/284 |
| 2006/0175753 A1 * | 8/2006 | MacIver ............. | A63F 3/00643 463/43 |
| 2007/0117602 A1 * | 5/2007 | Madigou ............. | A63F 3/00643 463/14 |

(Continued)

FOREIGN PATENT DOCUMENTS

| FR | 2738159 | * 7/1997 | ............... A63F 3/02 |
|---|---|---|---|
| GB | 2271724 | * 4/1994 | ............... A63F 3/00 |

OTHER PUBLICATIONS

"International Search Report and Written Opinion", dated Nov. 4, 2021, from the counterpart PCT application PCT/US21/43987.

*Primary Examiner* — Michael D Dennis
(74) *Attorney, Agent, or Firm* — John L. Rogitz

(57) ABSTRACT

An electromagnetic game board includes a configurable grid of electromagnets under a game board to move game pieces on the board. Alternative to electromagnets is acoustic levitation through soundwave. In an oscillating electric field (four sides), a magnet can create excite ultrasound that quickly contract and rebound its original shape to push out pulses of air.

49 Claims, 23 Drawing Sheets

(56) References Cited

U.S. PATENT DOCUMENTS

| | | | |
|---|---|---|---|
| 2007/0216095 A1 | 9/2007 | Jacobs | |
| 2009/0017889 A1* | 1/2009 | Zhukov | A63F 3/02 |
| | | | 463/14 |
| 2009/0117994 A1 | 5/2009 | Kelly et al. | |
| 2009/0270183 A1* | 10/2009 | Lin | A63F 3/00643 |
| | | | 463/43 |
| 2011/0272884 A1* | 11/2011 | Kraegeloh | A63F 3/00 |
| | | | 273/237 |
| 2013/0040734 A1 | 2/2013 | Yamamoto et al. | |
| 2013/0244784 A1* | 9/2013 | Assa | A63F 13/31 |
| | | | 463/40 |
| 2016/0132275 A1 | 5/2016 | Mackowiak | |
| 2018/0217690 A1* | 8/2018 | Bauer | G06F 3/0446 |
| 2019/0275411 A1* | 9/2019 | Hansen | A63F 13/213 |
| 2019/0388776 A1 | 12/2019 | Holmes | |
| 2020/0047059 A1 | 2/2020 | Paul | |
| 2021/0394043 A1* | 12/2021 | Perez | A63F 3/00214 |

\* cited by examiner

ELECTROMAGNETIC GAME BOARD

FIELD

The application relates generally to electromagnetic game boards.

BACKGROUND

Game boards on which game pieces are moved can be modified for contemporary technology to provide a more interesting standalone game experience or for use in conjunction with other entertainment systems such as computer game consoles and streaming game services.

SUMMARY

A device includes a game board substrate with a first surface on which game pieces can move. A grid of electromagnets (EM) is juxtaposed with the substrate with at least first and second EM being individually addressable to cause at least one game piece to move on the substrate.

In example embodiments, at least one processor is configured to control energization of the EM to cause at least a first game piece to move from a first location to a second location. The first location can be a current location of the first game piece and the second location can be a demanded location of the first game piece.

The processor may be programmed with instructions to identify the first location at least in part using a camera that images the game board substrate, and/or using signals from a location receiver on the first game piece, and/or using a signal representing an electrical field generated by the first game piece being proximate to a deenergized EM, and/or using a magnetic field sensor, and/or using one or more signals generated by one or more sensor devices in the first game piece.

In non-limiting examples the processor is programmed with instructions to determine a path between the first and second locations to avoid collisions with other game pieces when the first game piece moves on the path from the first location to the second location. To this end the processor may be programmed with instructions to energize and deenergize individual EMs or individual groups of EMs to pull and/or push the first game piece along the path.

Additional example features include controlling the EM to flip the game piece from resting on a first surface to resting on a second surface, Additional example features include identifying that the game board substrate is tilted and responsive to identifying that the game board substrate is tilted, energizing at least one EM to hold the game piece onto the game board. Additional example features include identifying a calibration image of the game piece and correlating an optical location of the game piece to a location of the game piece relative to the EM grid at least in part using the calibration image.

Additional example features include the game board substrate including only a printed substrate and/or including a video display that communicates with a computer game console or computer game server to receive computer game information from the console or server.

Additional example features include the game piece being a smart game piece with at least one processor communicating via a wireless link with at least one processor of a component other than the game piece.

Additional example features include the game piece including at least one magnet and/or at least one motor configured for control by the processor of the game piece.

Additional example features include at least one elevator configured to move the game piece onto the game board substrate.

Additional example features include at least one robotic arm configured to move the game piece onto the game board substrate.

Additional example features include identifying initial locations of respective game pieces on the game board substrate, and automatically moving the game pieces from the initial locations to destination locations for game play.

Additional example features include correlating respective game pieces with respective owners and disposing game pieces related to respective owners in respective regions of the game board substrate.

Additional example features include determining a height of the game piece.

Additional example features include responsive to a demanded game piece image, producing the game piece using 3D printing.

Additional example features include identifying a surrogate game piece for use in lieu of a demanded game piece, and executing a game using the surrogate game piece in place of the demanded game piece. Additional example features include visibly indicating that the surrogate game piece is being used for the demanded game piece.

In another aspect, an assembly includes a game board substrate on which at least a first game piece can move. Plural spaced-apart electromagnets (EM) are juxtaposed with the game board substrate. At least one processer is programmed with instructions to selectively energize the EM to move the first game piece on the game board substrate.

In another aspect, a method includes energizing a first electromagnet (EM) to move a first game piece toward a destination on a game board, and deenergizing the first EM and energizing a second EM to move the first game piece toward the destination.

The details of the present application, both as to its structure and operation, can best be understood in reference to the accompanying drawings, in which like reference numerals refer to like parts, and in which:

DETAILED DESCRIPTION

Figure 1:
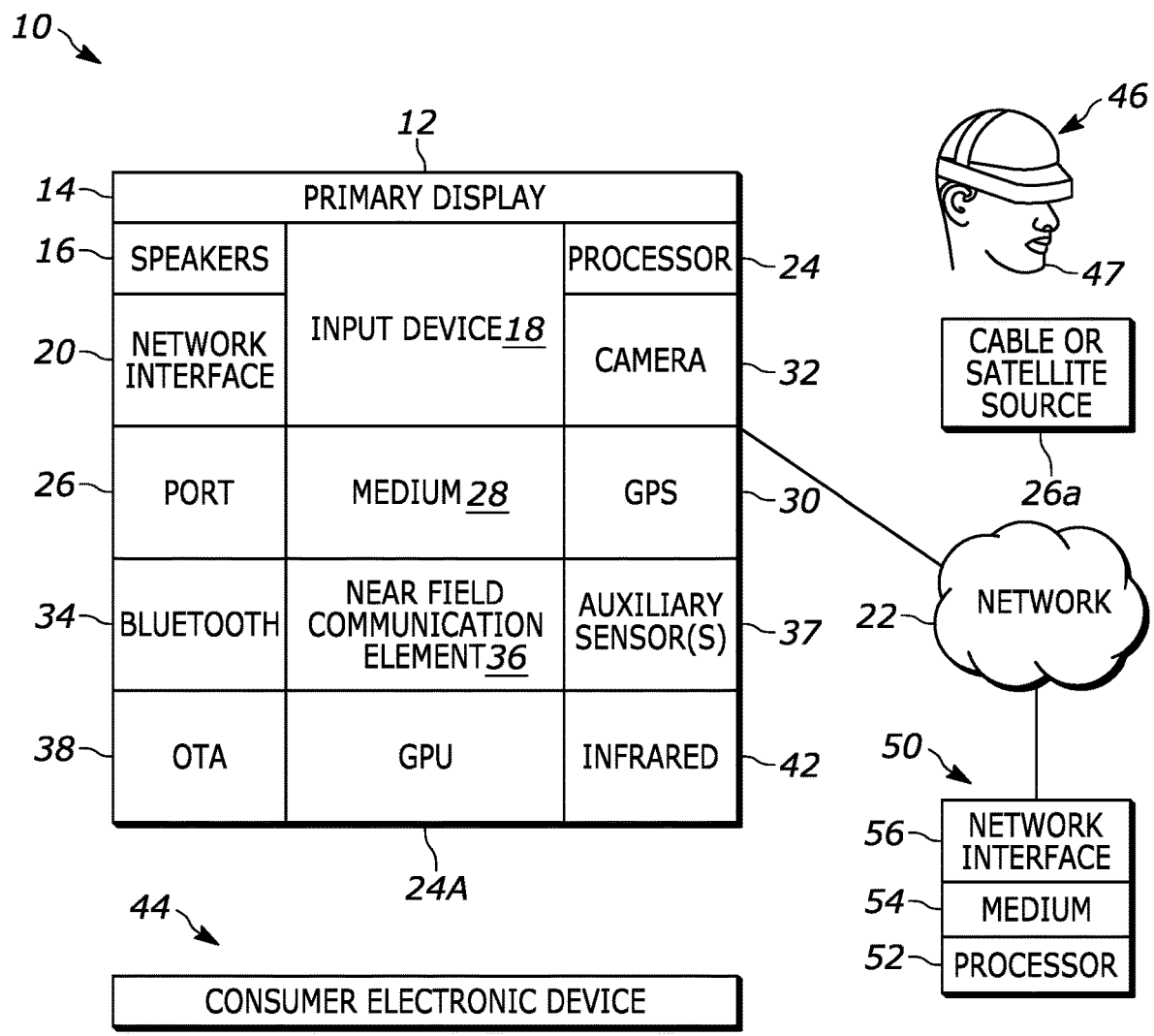
FIG. 1 is a block diagram of an example system including an example in accordance with present principles.

This disclosure relates generally to computer ecosystems including aspects of consumer electronics (CE) device networks such as but not limited to computer game networks and electromagnetic game boards. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access web sites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input ports 26 such as a high definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or, the source 26a may be a game console or disk player containing content. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimensions.

Continuing the description of the AVD 12, in some embodiments the AVD 12 may include one or more cameras 32 that may be a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12.

Still referring to FIG. 1, in addition to the AVD 12, the system 10 may include one or more other CE device types. In one example, a first CE device 44 may be a computer game console that can be used to send computer game audio and video to the AVD 12 via commands sent directly to the AVD 12 and/or through the below-described server. Or, the first CE device 44 may include the same components as the AVD 12 some or all of which may be used to implement a game board in addition to other game board components described herein.

A second CE device 46 may include similar components as the first CE device 44. In the example shown, the second CE device 46 may be configured as a computer game controller manipulated by a player or a head-mounted display (HMD) worn by a player 47. In the example shown, only two CE devices 44, 46 are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 50, it includes at least one server processor 52, at least one tangible computer readable storage medium 54 such as disk-based or solid state storage, and at least one network interface 56 that, under control of the server processor 52, allows for communication with the other devices of FIG. 1 over the network 22, and indeed may facilitate communication between servers and client devices in accordance with present principles. Note that the network interface 56 may be, e.g., a wired or wireless modem or router, Wi-Fi transceiver, or other appropriate interface such as, e.g., a wireless telephony transceiver.

Accordingly, in some embodiments the server 50 may be an Internet server or an entire server "farm", and may include and perform "cloud" functions such that the devices of the system 10 may access a "cloud" environment via the server 50 in example embodiments for, e.g., network gaming applications. Or, the server 50 may be implemented by one or more game consoles or other computers in the same room as the other devices shown in FIG. 1 or nearby.

Electromagnet Grid Game Board

Figure 2:
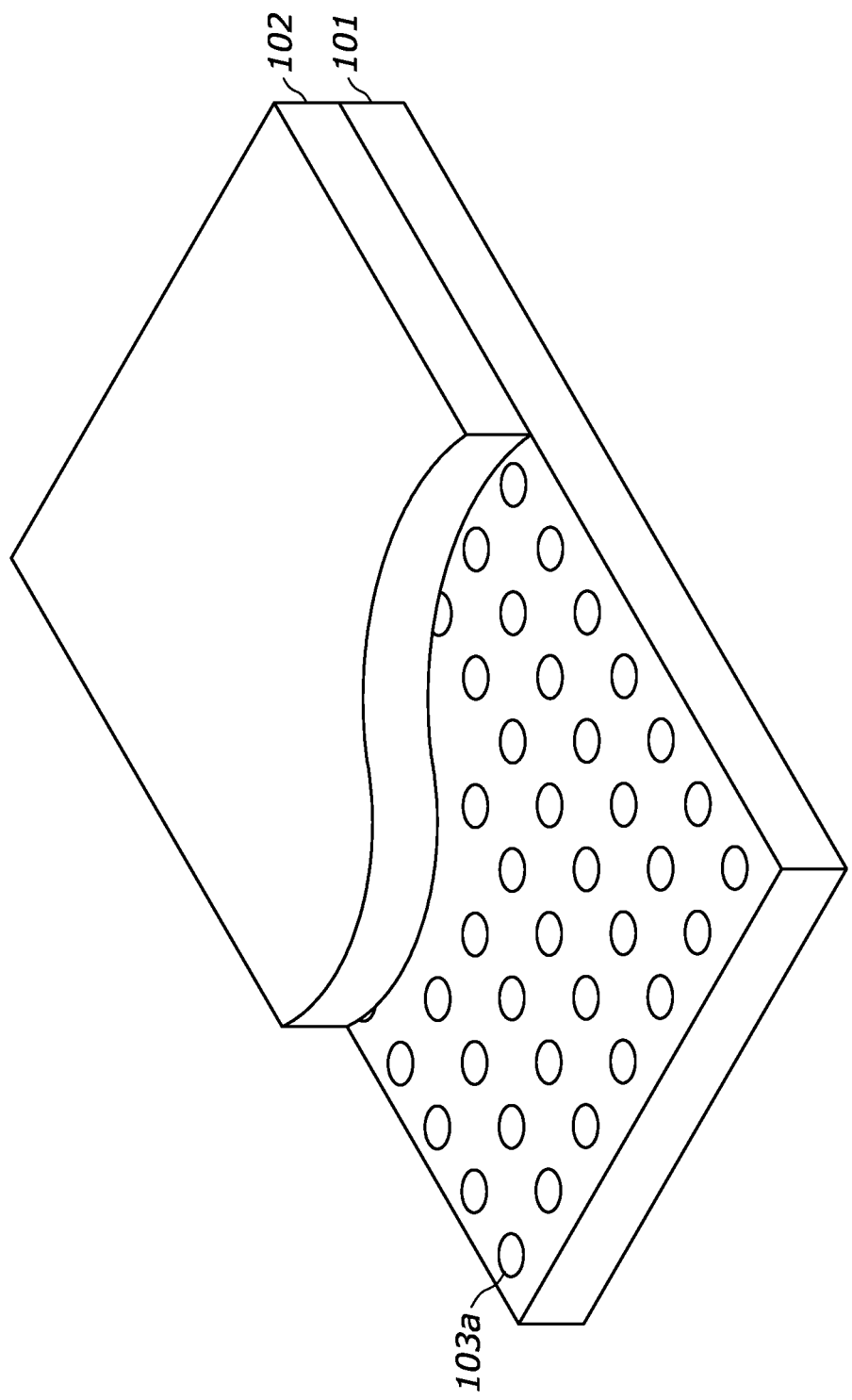
FIG. 2 is a partially cut-away view of a game board with electromagnetic (EM) grid.

FIG. 2 illustrates an implementation of a board with a layer 101 containing a grid of electromagnets 103. The electromagnet grid layer 101 is behind the board layer 102, which is shown partially cut-away to show the grid of electromagnets 103 in layer 101. The board layer 102 may be a statically printed board or may be a display device as discussed elsewhere herein. Other layers or features may be added to the implementation such as a protective layer on top of the board or a layer containing sensor elements. Item 103a is a single independently energizable electromagnet in layer 101, which consists of a grid of many such electromagnets. The electromagnets 103 can be energized to create magnetic fields that can cause magnets and/or ferrous metal to move along the board. An electromagnet grid has the advantage over physically moving magnets in that each game piece can be independently moved at its own speed and direction at the same time.

Figure 3:
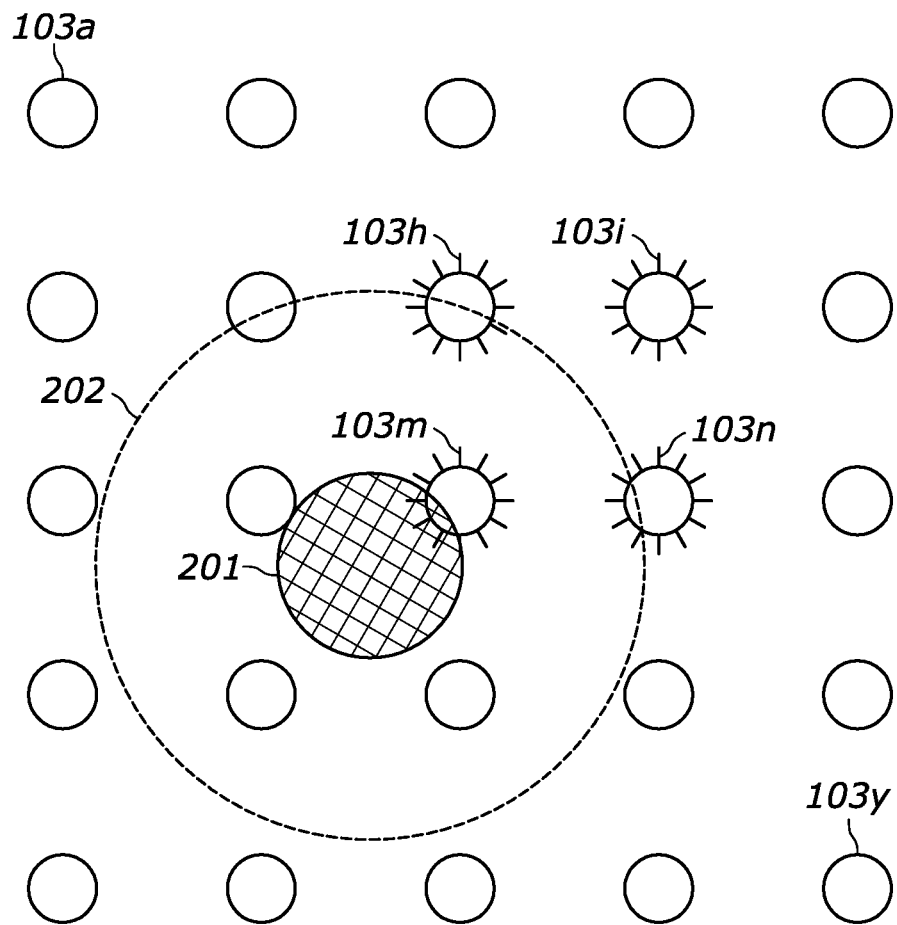
FIG. 3 schematically illustrates the EM grid.

FIG. 3 shows a top view of a game piece interacting with a grid of electromagnets 103. The game piece to be moved has a part that is a draggable element 201 that is made of ferrous metal or a magnet. The draggable element 201 can be attracted by a magnetic field to drag the game piece it is part of. The area of the board covered by the game piece 202 extends beyond the draggable element 201, as indicated by the dashed outline. The electromagnets 103h, 103i, 103m, 103n in the grid are energized to attract the draggable element 201 towards their location. The set of electromagnets that is energized is changed over time to drag the game piece further. In some implementations, the set of electromagnets that is energized is changed based on a sensed position of the game piece. In some implementations, the set of electromagnets that is energized is changed based on timing.

Figure 4:
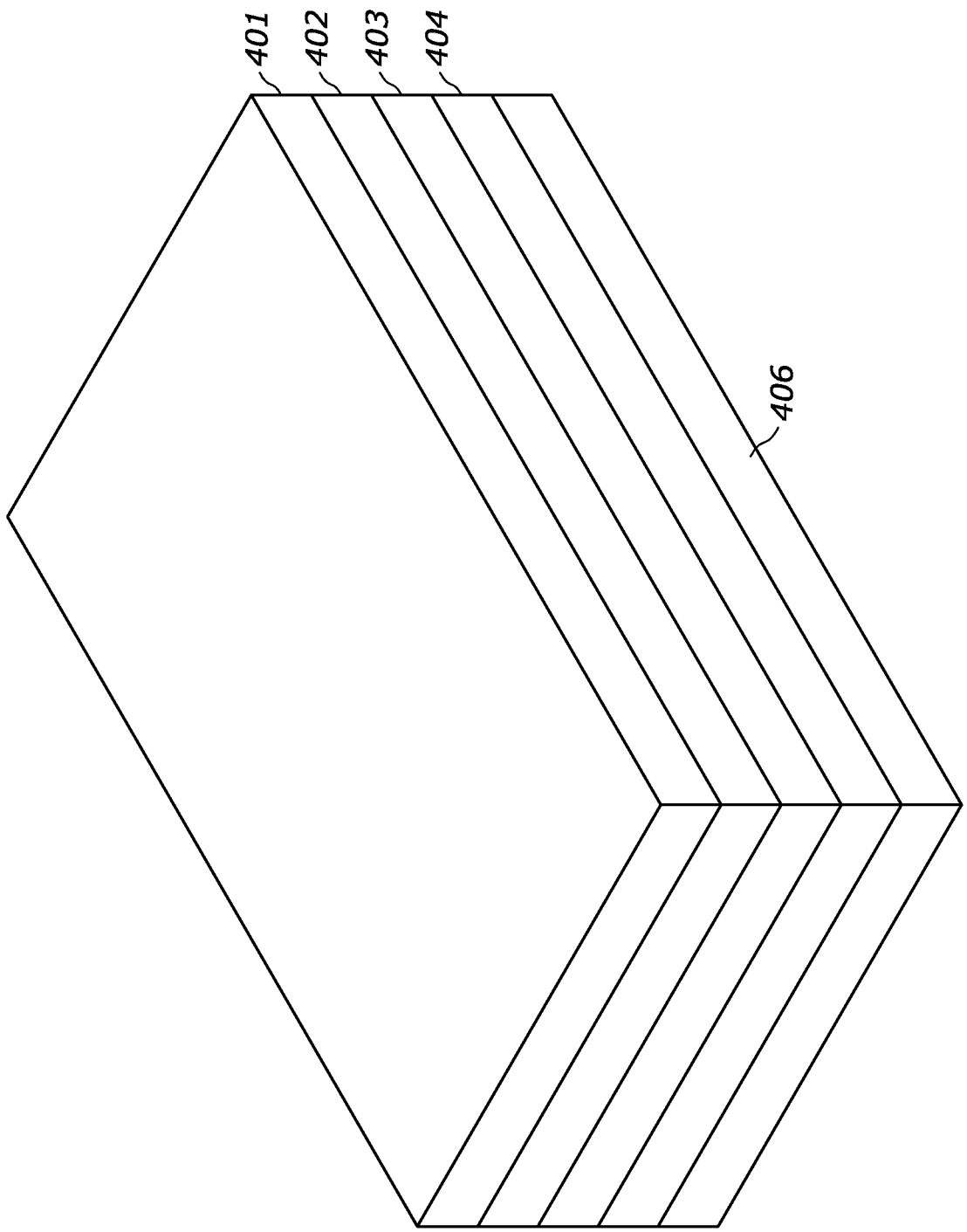
FIG. 4 is a perspective view of a game board showing various layers.

FIG. 4 shows a cross section of a typical game board implementation. The layers may be in the order shown or in other orders. A first layer 401 is a protective layer on the surface of the game board. In some implementations, the first layer 401 can be removed for cleaning, or swapped out as it becomes worn or damaged. A second layer 402 is the layer that the user sees when playing. In some implementations the second layer 402 is statically printed and/or digitally printed and may be able to be swapped out to provide different boards for different games or portions of games. In some implementations the second layer 402 is a display device and what the user sees on the display device is dynamically generated by the game system. A third layer 403 is a grid of electromagnets that can be used to generate dynamic magnetic fields to move game pieces located on the board.

A fourth layer 404 contains sensors, which can be used to determine things such as the location of game pieces located on the game board, the type of game pieces located on the board, or the identity of game pieces located on the board. The fourth layer 404 may include a capacitive or resistance sensitive layer to sense where game pieces are in contact with the grid, which can be used for determining the location of game pieces, either alone or in conjunction with other methods for determining the location of game pieces. Game pieces can have different capacitive properties on their bases to allow the system to discern different game pieces through the capacitive sensitive layer. A capacitive or resistance sensitive layer can also be used to make the game board touch sensitive.

A layer of ferrous backing 406 may also be provided to allow game pieces with a magnetic base to stick to the game board even when the electromagnetic grid is not energized, but still allow the game pieces to be moved on the game board by magnetizing portions of the electromagnetic grid. Such a game board can be used in horizontal orientations, such as hanging on a wall for use in spaces with limited floor space, or in situations where it is likely that the game board will get moved, such as in a vehicle.

A game piece with a ferrous base can be held to a game board with a ferrous layer as long as the electromagnetic grid is energized but will not be held in place when the electromagnetic grid is not energized. A game piece with a ferrous or magnetic base can be held to a game board without a ferrous layer as long as the electromagnetic grid is energized but will not be held in place when the electromagnetic grid is not energized. Such an implementation used in a vertical orientation can be used for interesting games where pieces sometimes fall based on in-game events.

Not all layers are required for every implementation. Additional layers may be added to provide additional features. For example, a layer may be added to allow the game board to be touch-sensitive. The ordering of the layers may change from one implementation to another. For example, the fourth layer 404 may be located above the third layer 403 in some implementations. In some implementations, layers may be combined. For example, the third and fourth layers 403, 404 may be combined into a single layer with electromagnet and sensors elements alternated in a grid.

As understood herein and described further below in relation to FIG. 5a, a magnet can be provided in a flat game piece to allow an electromagnetic grid of a game board to flip over the game piece. If the electromagnetic grid energizes the portion of the grid under the game piece with the same polarity as the magnetic field from the bottom side of the game piece it will repel the game piece, pushing it up. The magnetic field strength can be varied in real-time to control the speed in which the game piece is pushed up. The magnetic field on the top of the game piece will be attracted to the magnetic field generated by the electromagnetic grid. This attraction will pull the top of the game piece down to the board in the location where the electromagnetic grid is energized.

Many types of game piece movement can be accomplished through the use of an electromagnetic grid, including but not limited to, sliding, flipping, rotation along various axes, rolling, jumping, vibration, and levitation. Rotation along an axis that is perpendicular to the surface of the game board can be accomplished by energizing cells of the magnetic grid near different ends of the game piece to pull in different directions. This can be enabled by having more than one ferrous or magnetic element in the base of the game piece, or by having an element that is not a perfectly round shape in the base of the game piece. One example of rotation along an axis that is parallel to the surface of the game board is illustrated in FIGS. 5a-5d, discussed further below.

In some implementations, the game system is programmed with the polarization for each side of the game piece to know which polarization to energize the game board with to flip the piece to the desired side. In some implementations, sensors in the game board can sense the polarization of the magnetic field coming from the game piece to determine the polarization with which the electromagnetic grid will need to be energized with to flip the game piece. In some implementations, the game system can use trial and error to determine the polarity needed to flip the game piece. To do this the portion of the grid under the game piece is energized and sensors, such as cameras from any of the devices described herein, may be used to determine if the piece flipped because of that. If the game piece did not flip, the polarity in which the grid is energized is reversed, which then causes the game piece to flip.

The polarization of the magnetic field emitted by a cell in the electromagnetic grid is determined by the direction of the current flow through the current in the electromagnet. By reversing the polarity of the electric charge applied to the coil, the current flows in the other direction and reverses the polarity of the emitted magnetic field.

Different portions of the electromagnetic grid can be energized independently, with the polarity of each portion determined individually. This allows multiple game pieces to be flipped simultaneously, with the polarity for each flip determined individually. Other game pieces can be unaffected while game pieces are flipped.

To flip a game piece that is not flat, such as game dice that are a cube or other shape with multiple sides, each side can have a magnet with the same polarity facing outwards. To start the flip, the grid is energized under the game piece with a polarity to repel the game piece, while simultaneously energizing the grid next to the game piece on the side of the game piece that is to be the new bottom side with polarity to attract the game piece. The energizing of the grid can then switch to turn off the repelling cells closest to the side that is being attracted as the new bottom while switching which cells are energized to attract the game piece closer to the original game piece location. Then all of the pushing polarization is turned off as the attracting energizing is moved closer to the original game piece location. Finally, the attracting energizing is moved to align with the original game piece location to pull the game piece back into its original location with the newly chosen side on the bottom.

Game Pieces

Figure 5A:
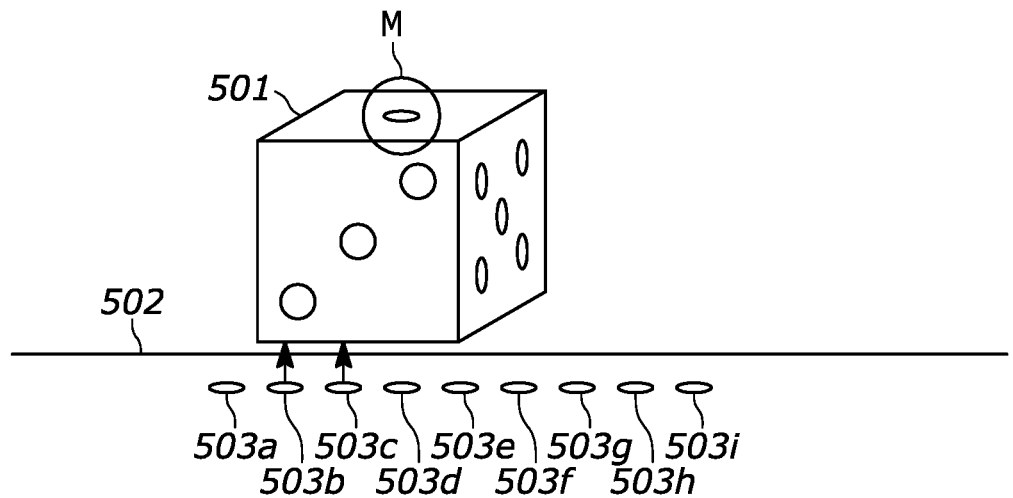
FIGS. 5*a*-5*d* illustrate a parallelepiped-shaped game piece being flipped by the EM grid.
Figure 5B:
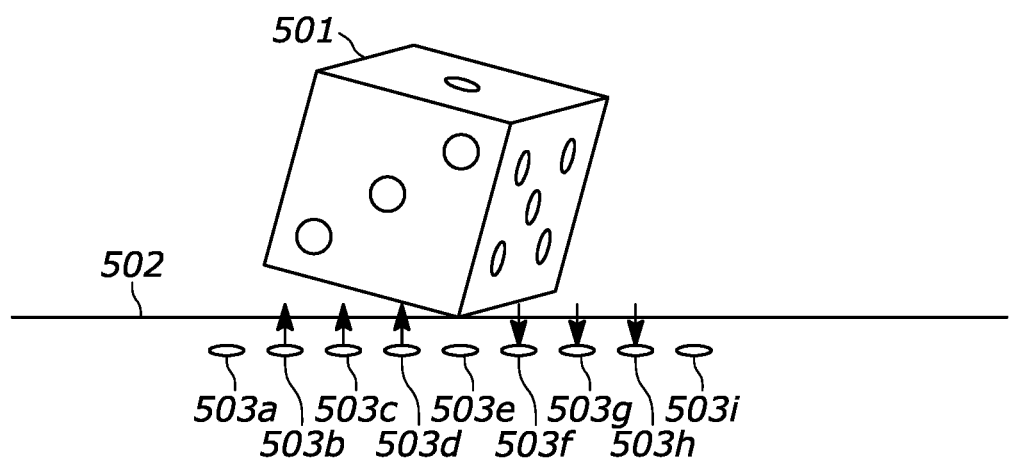
Figure 5C:
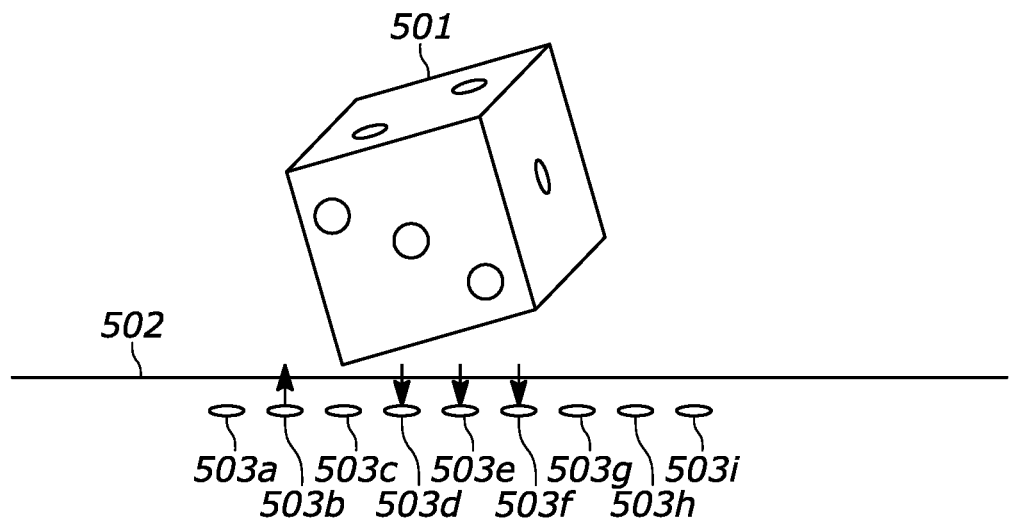
Figure 5D:
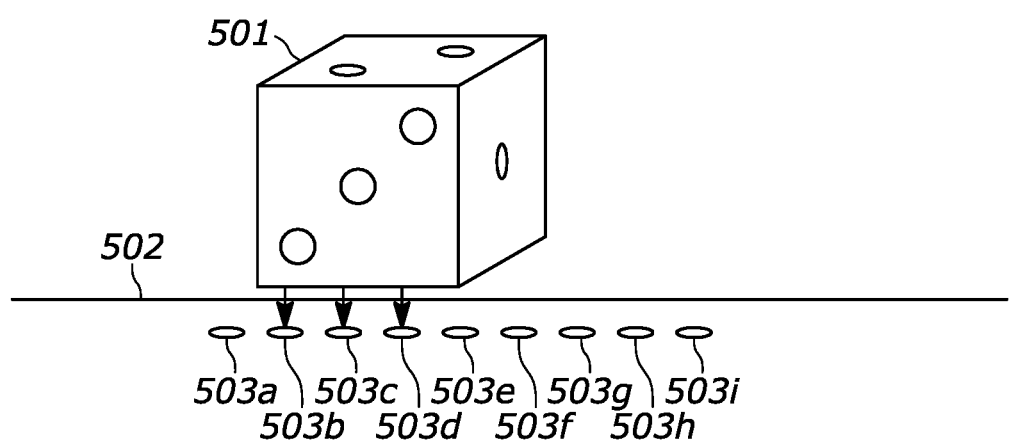

FIGS. 5a-5d show an implementation of flipping a multiple-sided game piece 501. In FIG. 5a, the game piece is shown as a 6-sided die, which is commonly used in board games, but other shapes are also supported. The game piece 501 has magnets "M" (only a single magnet "M" shown in FIG. 5A for ease of description) on each side with the same polarity facing outwards. FIG. 5a shows the initial state of the game piece 501 disposed on the game board 502 where none of the cells of the electromagnetic grid 503a-503i under the game piece are energized. FIG. 5b shows the state in which the game system starts to flip the game piece 501, which is accomplished by energizing cells in the electromagnetic grid under the game piece 503b-503d with a polarity to repel the game piece so that the game piece is pushed upwards. Simultaneously the cells in the electromagnetic grid 503f-503h beside the game piece on the side that is desired to be on the bottom at the end of the flip are energized with a polarity to attract the game piece, which causes the game piece to rotate towards that size as it is lifted. FIG. 5c shows an intermediate state where the cells in the electromagnetic grid 503c-503d closest to the cells in the electromagnetic grid 503f-503h that were energized to attract the game piece are no longer energized to repel the game piece. The set of cells in the electromagnetic grid that is now energized to attract the game piece has shifted from the initial set of 503f-503h to a set of cells 503d-503f that is closer to the original location of the game piece. FIG. 5d shows the final state in which no cells in the electromagnetic grid 503 are energized to repel the game piece and only the cells in the electromagnetic grid 503b-503d under the original game piece location are energized to attract the game piece. Depending on the implementation of the game system, the electromagnetic grid under the game piece may be deenergized after the flip or may remain energized to continue to hold the game piece securely to the game board.

Accordingly, the game system can use one or more magnets in a game piece to flip over that game piece on the board. As discussed, this can be accomplished by energizing the portion of the magnetic grid under the magnet and an additional portion of the grid nearby with the opposite polarity to the magnet such that the magnetic field emitted by the grid opposes the magnetic field of the magnet. Since the magnetic field emitted by the grid is also attractive to the magnetic field on the top side of the game piece, when the game piece is lifted, the top side is attracted to the game board, causing the game piece to flip. This can be quite useful for a coin shaped token. This can also be used to flip dice if a die contains a magnet for each face on the die, in which case the same polarity of the magnets would face out on each die face and the portion of the grid nearby would be energized with the opposite polarity to attract the magnet in the side to flip down onto the grid. Sensors that can detect the orientation of the die, such as multiple tracking tags in the die or a camera, can be used so that the game system knows which direction to energize with the opposite polarity to get the die to flip so that the desired face ends up on top.

Figure 6:
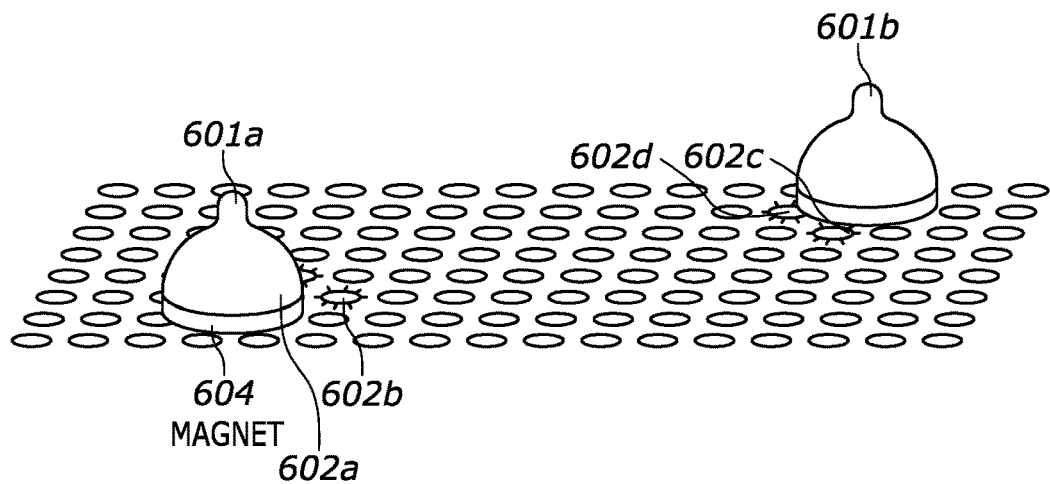
FIG. 6 illustrates example game pieces on a game board.

FIG. 6 shows a cross section of a game board with two game pieces 601a and 601b that can be moved simultaneously. Each game piece can include a magnet or ferrous metal 604 at or near the bottom part of the game piece that touches he game board. The electromagnet grid cells 602a and 602b just beside game piece 601a are energized, which pulls the first game piece 601a along the game board in towards them. The electromagnet grid cells 602c and 602d are energized beside the second game piece 601b, which pulls the second game piece 601b towards the electromagnet grid cells 602c and 602d.

Moving Game Pieces to Avoid Obstructions

Figure 7:
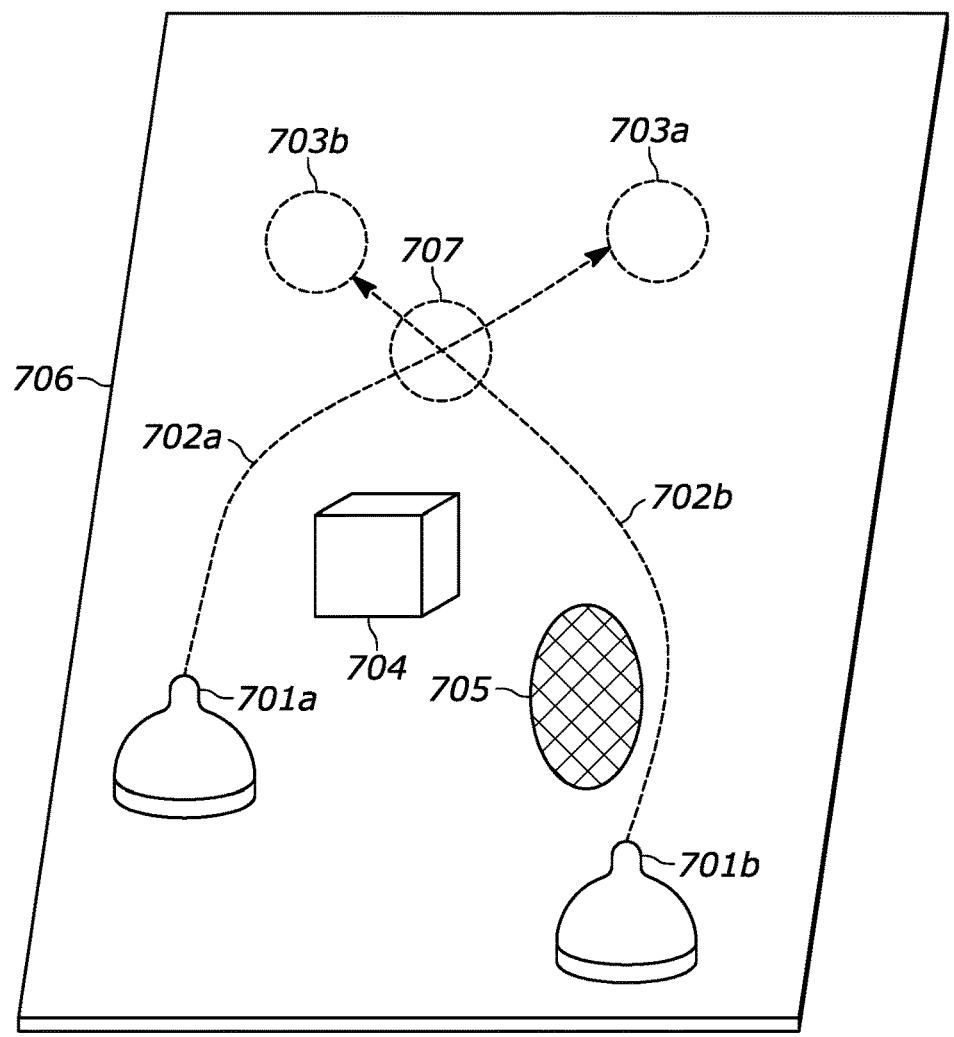
FIG. 7 illustrates game pieces being moved to avoid interference.

FIG. 7 illustrates further principles. A game board 706 supports first and second game pieces 701a and 701b that move simultaneously to new positions 703a and 703b. A first path 702a shows the path that the first game piece 701a will follow when it moves, which is routed around a third game piece 704 that is placed on the game board and will not be moved. A second path 703b shows the path that the second game piece 701b will follow when it moves, which is routed around an area 705, which is an area that the game piece should avoid in-game that is displayed or printed on the game board. An area 707 is where the first and second paths 702a and 702b cross each other. The timing of the movements of pieces 701a and 701b are adjusted to ensure that they are not simultaneously in the area 707 to avoid a collision between the first and second game pieces 701a, 701b.

Overall EM Grid Control Logic

Figure 8:
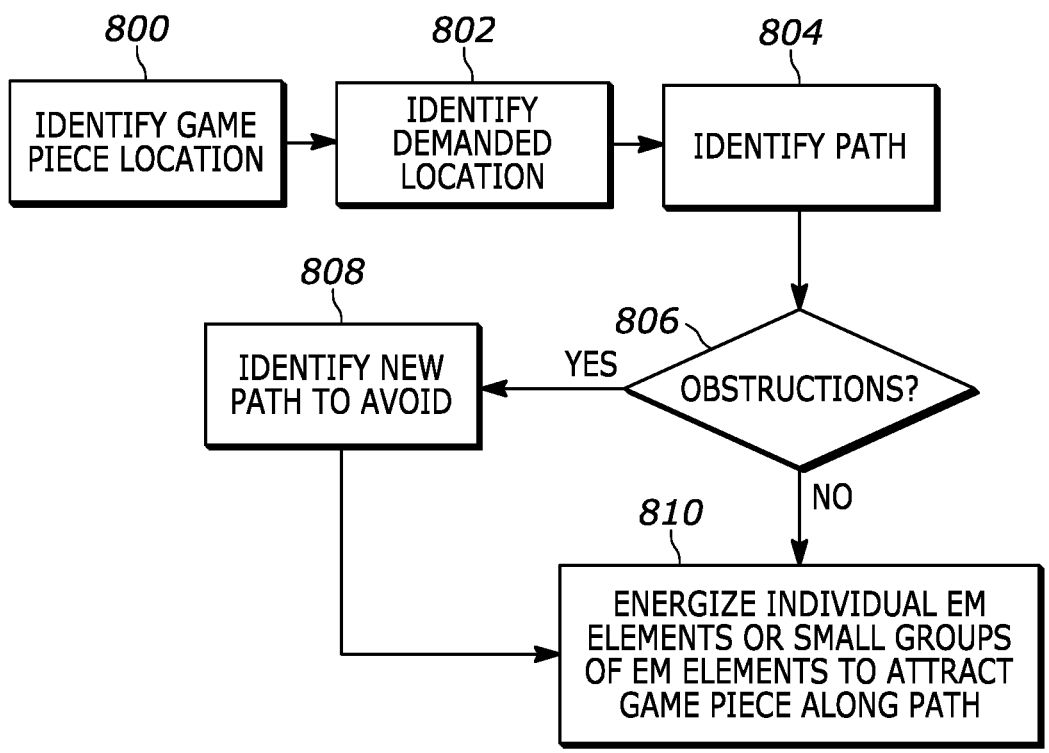
FIG. 8 illustrates example overall logic in example flow chart format.

FIG. 8 illustrates logic in accordance with principles above that may be executed by, for example, any processor described herein as may be implemented in, for example, any of the game boards described herein.

Commencing at block 800, for one or more game pieces on a game board, the location of each game piece is identified relative to the game board. This may be done using one or more camera that images the game board or through other means such as a GPS receiver on the game piece, magnetic field sensing to sense the origin of the magnetic field of the magnet of the game piece, sensing the location of one or more tags in the game piece, etc. Thus, a game piece may include, e.g., any of the location sensors described herein, any of the processors described herein, and any one or more of the wireless transceivers described herein. In some implementations, one or more cells of an electromagnet grid are not energized and the electrical current generated in at least one of the EM cells when a game piece is moved in proximity to the cell is analyzed for determination of the location of the game piece. In other implementations, one or more sensors in the game piece including (RFID, NFC, optical cameras, Bluetooth Low Energy (BLE), and Zigbee) are used in conjunction with complementary sensors in the game board to detect the location of game pieces that are on the game board.

Proceeding to block 802, the demanded new location of the game piece is identified. This may be a demanded location from an algorithm executed by the game board or input by a user or identified by other means.

Once the initial and final locations on the game board are identified at blocks 800 and 802 respectively, at block 804 a path is calculated between the two locations over which the game piece is to move. The game system can also calculate the paths of the game pieces that will be moving simultaneously to create paths and speed of travel that will prevent collisions at decision diamond 806. For each piece, collisions can be avoided with other moving game pieces, stationary game pieces or terrain placed on the game board, or things that are drawn on the game board such as walls or lakes by altering the old path to identify a new path as indicated in FIG. 7 above at block 808. In some cases, multiple game pieces can travel over the same position on the game board, and timing can be adjusted to prevent multiple game pieces from having a travel path that would occupy that portion of the game board at the same time. The game system may modify the speed in which one or more game pieces moves so that the speed is not constant over the full path of the game pieces movement.

Further, the original path can be altered to assume a path that deviates around the electromagnets over which an obstruction such as another game piece is disposed. The path may deviate by a minimum amount, i.e., by altering the path to cross the closest electromagnet that is not implicated by the location of the obstruction.

In some cases, game pieces or terrain on the game board that is already in the desired final position can be temporarily moved to allow other game pieces to be moved through the space they were occupying before moving those game pieces back. Such temporary movements may be necessary in cases where an area of a game board is completely surrounded by walls or other terrain game pieces and another game piece needs to move in or out of that area.

In some implementations, the game system moves different game pieces at different speeds when moving multiple game pieces simultaneously. This allows all of the game piece movements take the same amount of time to complete despite different game pieces needing to move different distances. Having all simultaneous game piece movements take the same amount of time to complete can help players to perceive all of the movements as a single action.

From block 808 or from decision diamond 806 if no obstructions exist in the original path, the logic moves to block 810 to energize individual electromagnets (EM) such as individual EM 103(*a*) shown in FIG. 3 to pull the game piece along the path. It is to be understood that pushing the game piece may also be employed by reversing the EM polarity of an EM behind the game piece.

In addition to or in lieu of energizing individual EM, small groups of EMs that are located next to each other may be energized in concert. Essentially, an EM just in front of the game piece along the intended path of travel is energized to attract the magnet of the game piece, with other EM remaining deenergized. When the game piece reaches the EM, it may be deenergized and another EM further along the path energized to continue to attract the game piece toward the destination, and so on. To control the speed of advance of the EM, different numbers of EM may be energized. For example, a single EM may be energized to move a game piece at a slow speed and two EM that are next to each other may be energized simultaneously to move a game piece at a faster speed. EMs in front of the game piece may be energized to pull the game piece and EMs behind the game piece may be simultaneously energized at the opposite polarity to both push and pull the game piece at an even faster speed.

Thus, game pieces are moved by energizing cells in the electromagnetic grid offset from the center of the game piece in the direction in which movement is desired, which pulls the game piece towards the energized cells. As the piece moves, the set of cells that are energized is adjusted to continue to be slightly offset in the desired direction of movement.

Additional Game Piece Details

Figure 9:
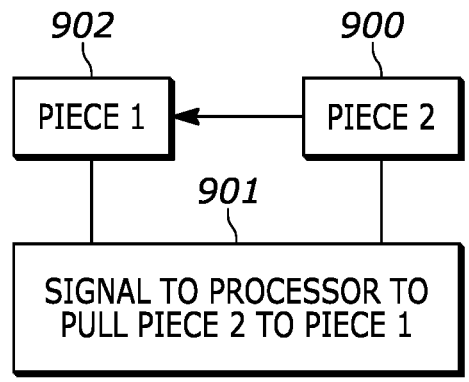
FIG. 9 illustrates a game piece attracting another game piece toward it.

FIG. 9 illustrates that in some implementations, using the push and pull energizing method described above, game pieces can move around to attach to other pieces horizontally or vertically. For example, a knight piece 900 may signal at 901 to the game board processor to energize EMs so as to move toward a sword piece 902 and pull it into itself. It may then move toward a horse piece where it will pull itself upward on top of the horse piece. As another example, a door game piece may rotate to connect to a wall game piece when the door is closed.

Figure 10:
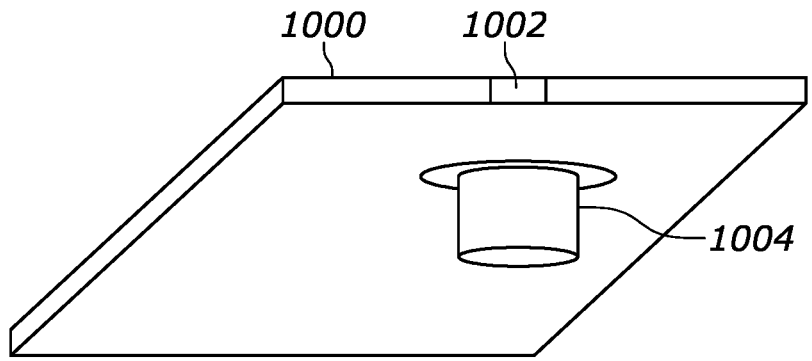
FIG. 10 illustrates using EM to hold a game piece on a non-level board.

FIG. 10 illustrates that a game board 1000 may maintain one or more EM 1002 energized to hold a game piece 1004 onto the game board 1000 when the game board is upside down or in a vertical orientation or other non-horizontal orientation with its playing surface facing up.

Figure 11:
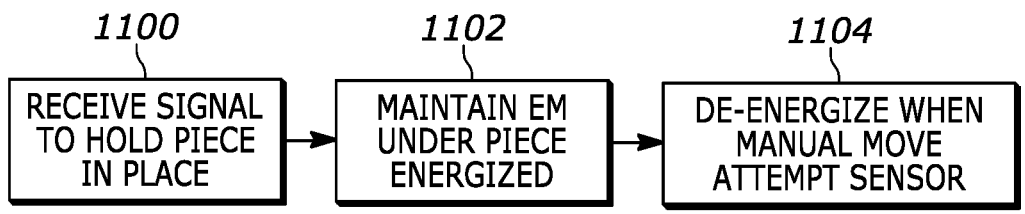
FIG. 11 illustrates example ancillary logic in example flow chart format.

FIG. 11 illustrates further principles. At block 1100 a signal may be received by the game board processor to hold the game piece 1004 in FIG. 10 in place, e.g., based on a sensor from an orientation sensor in the game board that it is no longer horizontal with the game surface facing up. One or more EM 1002 are energized at block 1102 to hold the game piece on the game board.

Thus, an electromagnetic grid can be used to keep game pieces held firmly in place as long as the electromagnetic grid is energized under each game piece. Such an implementation allows a game board to be mounted in a non-horizontal orientation or protected against game pieces moving when the game board gets bumped.

On a non-horizontal game board where the electromagnetic grid is continuously energized to hold the game pieces to the board, the electromagnets along the edge of a piece can be deenergized while engaging magnets on the opposite side of the piece can be energized to cause the piece to move in a particular direction while still being held to the game board. Having a game board, such as chess, mounted on a wall can be a huge space saver for smaller dwelling units, such as an apartment in a major city where having square footage to have a game board set up can be an issue. If the surface of the game board is a display screen, then a game board that is hung on a wall can display artwork when not being used to play a game.

At block 1104 the game system can sense when a game piece is being manually moved and can deenergize the portion of the electromagnetic grid that is holding that game piece to the game board. This can make it easier for a player to manually move a game piece on the game board when the game board holds the game piece in place when the user is not moving it. In some implementations, this detection can use one or more cameras to detect when a player grabs a game piece. In some implementations, this detection uses sensors to detect when the game piece changes locations.

Thus, a game board can be mounted vertically, as in a traditional TV or computer display. In some implementations the game board can be used as a TV or generic display device. This has the advantage that game pieces do not need to have magnets in them to have them adhere to the game board in a non-horizontal orientation.

The game system can detect when a game piece is within proximity to the game board and can energize the grid under where the game piece is to hold the game piece in place to the grid. This can allow the game board to securely hold game pieces in place, which can protect against the game board being bumped or allow the game board to be oriented in a non-horizontal orientation. In some implementations, the electromagnetic grid can energize in alignment with the game board graphics to have game pieces snap to valid locations on the game board. By energizing the grid under a game piece as a user places it in position the user will feel a satisfying pull as the game piece is held securely to the game board. In some implementations, the grid can be energized over a wide area as a piece is moved close. The user feels the pull when the piece gets close to the grid and the piece snaps securely in place wherever it touches the game board. In some implementations, the locations of all game pieces can be stored to a local or cloud memory server and can be used to restore all the pieces to their stored location states at a later time. In some cases, the stored location states can be used on a different game system device to resume a saved game state using different hardware.

An electromagnetic grid under the surface of the game board can be used to move multiple game pieces on the game board simultaneously. The cells in the electromagnetic grid are independently controllable, allowing manipulations of the cell output to be performed independently in the proximity of different game pieces.

In implementations in which only the cells in the electromagnetic grid under game pieces are energized continually, the set of cells under each game piece to move can be adjusted to be offset in the desired direction of travel, which will pull the game piece in the desired direction.

In implementations in which the electromagnetic grid is fully energized all the time, such as in non-horizontal game board applications, cells in the electromagnetic grid slightly offset from the game piece on the side opposite of the desired direction of travel are partially or fully deenergized, which will pull the game piece in the desired direction so that it is aligned with the fully energized cells.

In some implementations, instead of having a sensor that turns on and off the grid emitting fields to hold pieces in place, this control can be given to the user, such as in the form of a physical switch or menu option in the game system UI. By not having the grid emit magnetic fields to hold pieces in place when the board is in a stationary horizontal orientation it will reduce the amount of power consumed by the game system, which can be especially beneficial when the game system is running on battery power.

Calibration

Figure 12:
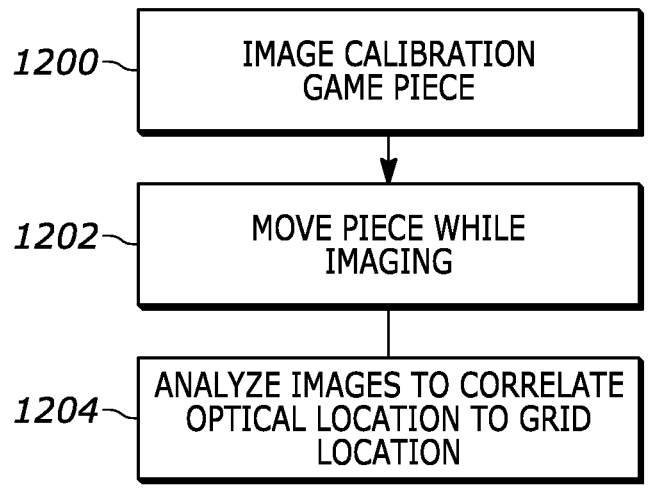
FIG. 12 illustrates example calibration logic in example flow chart format.

FIG. 12 illustrates further principles. Commencing at block 1200, optical game piece location detection can be calibrated by imaging a game piece at block 1200 and while imaging the piece, pulling the game piece at block 1202 to specific locations along the magnetic grid. Block 1204 indicates that the images from the video camera to correlate the location of the piece in the image to a particular location on the magnetic grid. This allows a camera to be positioned with high tolerance for positioning and orientation differences and still be used to provide accurate positioning information.

Smart Game Pieces

Figure 13:
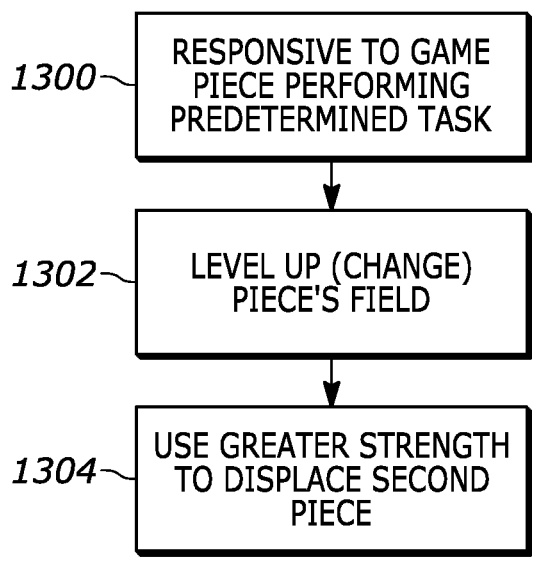
FIG. 13 illustrates example game piece attraction strength logic in example flow chart format

In some implementations, each game piece has a concept of character strengths, such as power, using the magnetic field. For example, as shown in FIG. 13, in a game a character's magnetic field may level up (block 1302) as the game piece performs (block 1300) certain predetermined task(s) such as obtaining characters such as a sword, in a fight scene, the leveled-up piece can easily push the lower magnetic field character out its grid position resulting in a loss or kill (block 1304).

Figure 14:
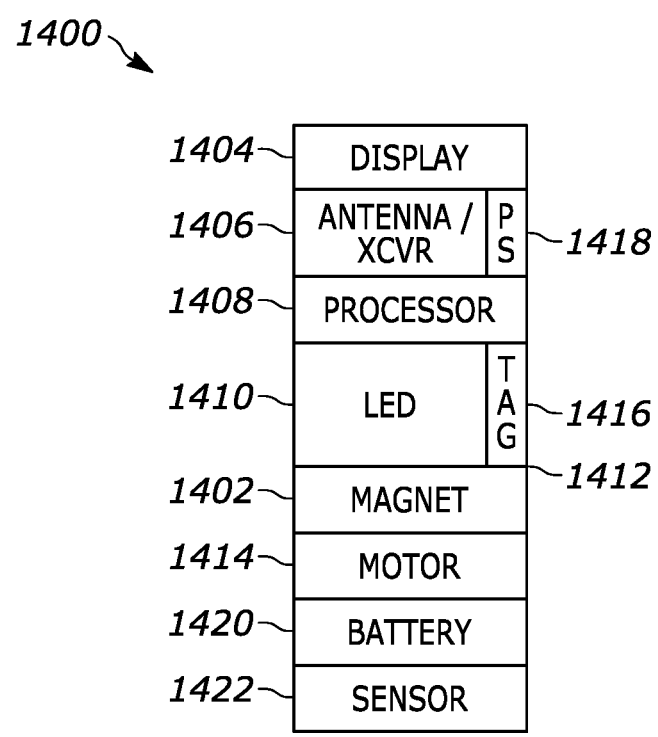
FIGS. 14 and 14A illustrate an example alternate "smart" game piece.

As shown in FIG. 14, a game piece 1400 with magnet 1402 can have a display screen 1404 that projects images which may be static, moving images, or holographic images. The game system can communicate wirelessly with a transceiver 1406 of the game piece to cause a processor 1408 in the game piece to control what is displayed by the game piece. It is to be understood that block 1406 includes appropriate antennae for communication with the game system and can also include a wireless power receiver.

In some implementations, a standard base design is used, which allows for the game piece that is on top of the base magnet 1402 to be swapped out to prevent the need for tracking and/or magnetic movement elements to be included in every game piece. A new game piece can be 3D printed in a shape that allows it to be mounted on a standard base. Thus, the magnet base 1402 may be removably coupled to the remainder of the game piece 1400 by a coupling 1412 by, e.g., a threadable or snapping engagement.

In some implementations, in addition to a magnet the base may include game interface elements, such as metal pieces to allow movement, tracking tags (such as RFID or NFC), or felt to allow for smoother movement, are added to the base of an object without these elements to allow it to be used as a game piece in the system. The game piece may have been created by 3D printing, or may have been acquired through other means, such as buying a traditional chess set and converting the pieces for use with the game system.

In some implementations, a game piece such as a game piece for a card game, or a sticker on a game piece, may be printed using a computer printer. The game system can associate a game piece ID with what is printed on the game piece so that it can properly identify the game piece when it is used in game play. In some cases, information about what is printed on a game piece, or how the game piece was 3D printed, can be stored in memory in the game piece.

In some implementations, the resolution of images displayed on the display 1404 can be quite low. If the resolution is reduced down to a single pixel covering the surface of a game piece, a meeple game piece (small character representing a player) can be made to change color even if it does not have the ability to display more detailed imagery. In some cases a display 1404 may thus cover an entire game piece exterior such that a game piece may have a few different color values it can display, such as the color of the base, color of the mid-section, and color of the top, which could be controlled independently.

With further regard to "meeple" implementations, tracking tags may be used for orientation detection in which more than one tracking device (RFID, NFC, optical markings) on a game piece allow the orientation of the game piece to be detected by the system when placed on the game board.

By having a set of generic game pieces, such as circular discs, rectangles, and cubes that can display images, a game system can have game pieces that can be used to represent game pieces in a wide variety of games, including game pieces that are invented after the game system is created. A rectangular game piece such as shown in FIG. 5*a* can be used to display the image of any card that might be laid on the game board, while a circular disk can be used as markers for various items that can be located on the game board. The imagery on the game piece can not only show what item the game piece represents, but the state of the item, such as how many points or what level the item currently has. In some implementations, the images displayed on a game piece are animated, such as a token indicating where a campfire is located that shows a flickering flame.

FIG. 14 also shows that game pieces can include the ability to light up in addition to or instead of the ability to show a controllable image using one or more light emitted diodes (LEDs) 1410 for example. Such an ability to light up could be used to indicate when a game piece is in operation, such as by emitting a green light, or could indicate when a game piece is in a bad state, such as with a red light. In some implementations, one or more e-paper displays can be used on a game piece to show images that do not emit light. In some implementations, one or more LED display screens on a game piece can be used to display an illuminated image on a game piece. In some implementations, a game piece includes both light-emitting and non-light-emitting display elements.

Wireless charging transmitters under the game board can be used to keep the batteries of powered game pieces placed on the game board charged. A battery is indicated at 1420.

Sensors 1422, including cameras, proximity detectors, and motion detectors, may also be provided on the game piece.

In some implementations the game system uses permanent magnets behind the game board to move game pieces on the game board. The game pieces can have ferrous metal or a magnet in their base, which will be attracted to the magnetic field from behind the game board, which move so that the electromagnetic attraction drags the game pieces across the surface of the game board. In some implementations, the moving magnetic field is generated by physically moving one or more magnet behind the game board, which may be a permanent magnet or an electromagnet.

In some implementations, the game piece 1400 can contain one or more motors 1414 that can be controlled by the game system executed on a game console communicating with the game piece 1400. Such game pieces can be used to lift other game pieces up and place them on top of other game pieces. Motorized game pieces can be used for dramatic effect, such as having a game piece use a motor to physically push another game piece.

In some implementations, game pieces can store information about their state, and the information about the state of game pieces on a game board can be broadcast by the transceiver 1406 to the game system. In some implementations, the state information stored in a game piece is only relevant to the current game match. In some implementations, the state information stored in a game piece is persisted and is updated as the game piece is used in game play, such as a collectable game piece that grows in power or inventory as goals are accomplished or items are found in game play. Other information that can be stored in a game piece can include levels for various character traits or the current health level of a character. Such a game piece can act as a character in a role-playing game. In some implementations, the game or game system allows a player to save the state stored in a game piece so that the state can be restored to the saved state later. In some implementations, the player is allowed to edit the state information stored in a game piece through a user interface that is not part of game play. In some implementations, a game piece stores multiple separate sets of state information where different sets of state information can be used based on game play, which may be state information for different games, or may be state information for different characters within the same game. In some implementation, the stored information can be used to replay a segment or the entire game.

In some implementations, game pieces can act as smart game pieces and contain various user interface elements, including virtual UI elements that may be presented on the display 1404 and mechanical UI elements if desired. User interface elements that can be contained in a game piece can include sound emitters, touch sensitivity, proximity detection, microphones, cameras, or physical controls such as buttons, knobs, or sliders. In some implementations, a smart game piece acts as a peripheral to a game system and is controlled by the game system. In some implementations, the smart game piece 1400 includes a tactile generator 1416 to provide force feedback to users interacting with the game piece. This feedback can be in the form of variable resistance, force feedback, or various types of vibrations. For example, a knob can be easier or harder to turn based on the state of what the knob is adjusting in the game. The game system can energize the electromagnetic grid under the game piece to hold the game piece firmly in place as the user interacts with the game piece so that the force of the feedback does not cause the game piece to move. The mechanisms used to provide feedback to users can also be used to adjust the position of controls on a game piece, such as sliding a slider to a new position.

In some implementations, the game piece 1400 includes one or more proximity sensors 1418 to allow the detection of the game piece's location relative to things such as other game pieces, a game system, a player, or a transmitter that is set up to be a reference point. The board of a game system can contain a grid of tags that proximity sensors in game pieces can detect to determine the game pieces position relative to the board of the game system.

In some implementations, smart game pieces can communicate between themselves and do not need communication with another system, such as a game system to be fully functional. Using such smart game pieces allows someone to play a game using only a set of smart game pieces, such as by setting the game pieces on a standard tabletop, or on a printed game mat. Such smart game pieces can communicate over a network, such as Wi-Fi, to allow the game to have network functionality.

Figure 14A:
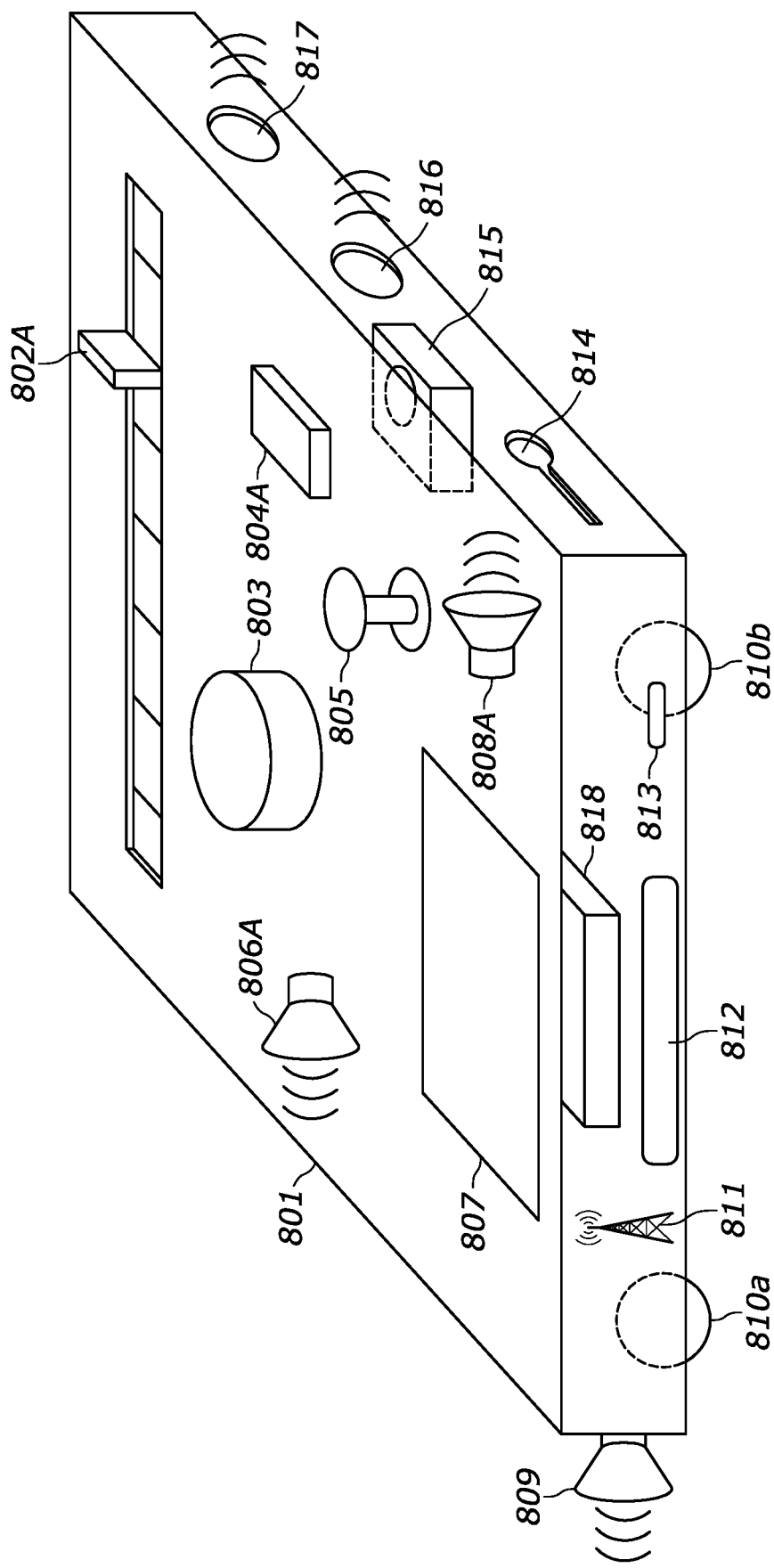

FIG. 14A illustrates further principles of smart game pieces. FIG. 14A shows a smart game piece with many elements. A smart game piece may not have all elements shown in FIG. 14A. A smart game piece may contain elements not shown in FIG. 14A. Some smart game pieces may contain multiple occurrences of the same element, such as a game piece with multiple buttons. Different game pieces in the same game system may contain different sets of elements.

A smart game piece 801 is shown as a rectangular block to make the diagram simpler, but a wide variety of game piece shapes are possible. The smart game piece contains elements for a user to interact with, including a slider 802A which can be moved back and forth, a knob 803 which can be rotated, a button 804A that can be pressed, and a joystick 805 that can be moved in multiple directions and my also function as a button.

The smart game piece is shown with a light emitting element 806A, which in this implementation can emit light with color and brightness that can be controlled. In some implementations, the light emitting element 806A may be combined with other elements, such as having the button 804A or knob 803 that is illuminated by the light emitting element 806A. An element on a smart game piece may have multiple light emitting elements 806A, such as two light rings around a button.

The smart game piece includes a display 807 that can display things such as an image, video, or user interface. The display may be a light emitting display, such as an LED display panel. The display may use a technology that does not emit light, such as e-paper. FIG. 14A shows the display 807 as a flat rectangle, but other shapes and geometries for the display are possible, such as wrapping a display around a curved surface on a smart game piece. In this implementation the display area 807 is touch sensitive, which allows a user to interact with the display area by touching it. In some implementations, the game piece 801 can have a display that is not touch sensitive. In some implementations, a game piece may include a touch sensitive area that is not a display area.

The smart game piece 801 can include audio elements 808A such as a speaker, buzzer, or clicker as well as a sound sensitive element 814, such as a microphone.

The game piece 801 may also include a light sensitive element 809, such as a camera, brightness sensor, or laser sensor. Multiple cameras can be used to capture images in different directions. The camera 809 may be used for games where a game piece needs "line of sight" to another game piece to be able to affect the other game piece or get a good shot at the other game piece. In some implementations, the game system can analyze images from the camera in the game piece to determine if the game piece has line of sight to another game piece. In some implementations, the game system can present images from the camera in the game piece to allow players to determine if the game piece has line of sight. In some implementations, video from a camera in a smart game piece can be included in a broadcast of a game match, such as an eSports competition.

As also shown in FIG. 14A, the game piece 801 can have one or more elements that allow the game piece to move itself including wheels 810*a* and 810*b* that the game piece can use to move itself. Other technologies, not shown, can be used to allow the game piece to move itself, such as electro magnets to pull and or push against magnetic fields or ferrous elements in the game board, elements that can push the game piece up and slide the game piece over while it is lifted, or legs to allow the game piece to walk.

The smart game piece 801 is shown with an antenna 811 for wireless communication, which can use various wireless technologies such as Wi-Fi, Bluetooth, NFC, 4G, 5G, FM, or AM. The antenna 811 may be used for wireless power transmission to provide power to the game piece when the game piece is in proximity to a wireless power transmitter, which can be built in to a smart game system to provide power to game pieces while they are on a game board or may be provided by a wireless charging station.

The smart game piece 801 may contain elements to allow it to be controlled by a game system, including a ferrous or magnetic element 812 to allow a game system to move the game piece, and a tag 813 to allow the game system to detect the position of the game piece.

The smart game piece also can include an element 815 to allow it to provide force feedback. Force feedback can be generated as various movements that can be felt by the user, such as vibrations, jolts, or air movements. The force feedback element 815 may allow force feedback to be generated along multiple axis. The force feedback element 815 may contain a motor that can move a portion of the game piece. The force feedback 815 may be combined with other elements, such as the knob 803 to allow the knob 803 to present the user with a varying amount of resistance to being turned, or to turn the knob to a desired orientation without user interaction. The game board and/or game piece may energize one or more electromagnets during the activation of a force feedback element 815 to prevent unwanted movement of the game piece.

Thus, game pieces can provide force feedback to users interacting with the game piece. This feedback can be in the form of variable resistance, force feedback, or various types of vibrations. For example, a knob can be easier or harder to turn based on the state of what the knob is adjusting in the game. For the visually impaired, game pieces may have raised Braille indicia on them. The game system can energize the electromagnetic grid under the game piece to hold the game piece firmly in place as the user interacts with the game piece so that the force of the feedback does not cause the game piece to move. The mechanisms used to provide feedback to users can also be used to adjust the position of controls on a game piece, such as sliding a slider to a new position.

The smart game piece can also include a proximity sensor 816, which may use various technologies such as lidar, radar, or RF. These sensors allow the detection of the game piece's location relative to things such as other game pieces, a game system, a player, or a transmitter that is set up to be a reference point. The board of a game system can contain a grid of tags that proximity sensors in game pieces can detect to determine the game pieces position relative to the board of the game system.

The smart game piece may also include a motion sensor 817, which can use technologies such as lidar, radar, or RF to detect motion in the vicinity of the game piece, or can use technologies such as gyroscopes or tilt switches to detect motion of the game piece.

Continuing with the description of FIG. 14A, the smart game piece 801 may include a control unit 818, which includes elements used to control the smart game piece 801. These included elements can include processing circuitry, memory, persistent storage, program code, or energy storage such as rechargeable or replaceable batteries. The control unit 818 may be configured to have the smart game piece 801 act as a pre-referral to a game system where the game system makes the determinations of how the elements of the smart game piece 801 are activated and the game system receives the state of sensing elements on the smart game piece 801. In some implementations, the smart game piece 801 may be configured with programming to control its own actions, such as to display a user interface to a user and control the user's interactions with the user interface and other elements of the smart game piece 801. In such an implementation, the state of the game piece can be communicated to a game system, and state information can be communicated from a game system to the smart game piece. In some implementations, the smart game piece 801 can communicate over a network to a game server using the antenna 811 and/or directly with another smart game piece 801 using the antenna 811.

In some implementations, smart game pieces 801 are used as part of a game system. In some implementations, smart game pieces 801 interact with each other in such a way that nothing other than a set of smart game pieces 801 is needed for game play.

In some implementations, the smart game piece 801 is modular, allowing the player to combine multiple parts to get a desired functionality for how the game piece will be used in game play. For example, a user can attach a button and some lights to a game piece to give the game piece the functionality to receive player button presses and to indicate its status using the lights. This can be accomplished by having a standard for the connections between modular game piece parts, such as a particular size, shape, and spacing for holes in which prongs on a part fit in, which also makes an electrical connection when the part is in place. The electrical connections can be made using a technology that enables "plug and play" capability, such as USB, so that the game piece can recognize the functionality of the part that was attached and will know how to control it.

Integration with Other Devices (Stand-alone system) In some implementations, the hybrid game system is implemented as a stand-alone system that is usable on its own.

(Collaboration with other systems) In some implementations, the hybrid game system is a stand-alone system, but can also collaborate with other systems, such as game consoles, computers, and/or mobile devices.

Figure 15:
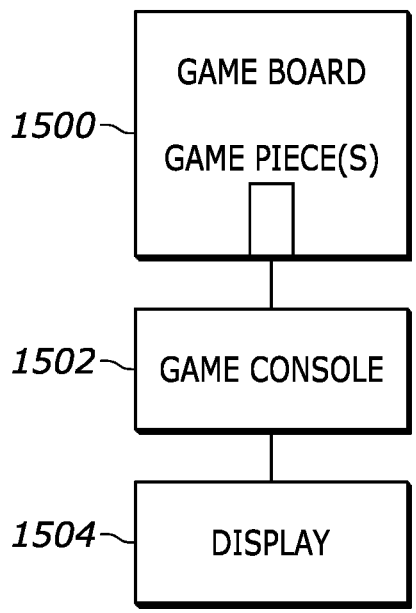
FIG. 15 illustrates a game board being used on conjunction with another device such as a computer game console.

(Cross-system gaming) In some implementations, a game is played on multiple systems simultaneously. In one implementation shown in FIG. 15, a game board system 1500 is communicatively and/or mechanically coupled to a game console 1502. The game board is presented by the game board system, while other game elements, such as video clips or 3D renderings are presented by the game console 1502 on a display 1504 separate from the game board.

(On-line system interactions) In some implementations, the hybrid game system is a stand-alone system, but can interact with one or more online services. In some implementations, an online service that the game system interacts with is also interacted with by other devices, such as game consoles, computers, and/or mobile devices.

(Acts as a peripheral) In some implementations, the hybrid game system acts as a peripheral to another device, such as a game console, computer, or mobile device. The game system may also be able to act as a stand-alone device or may require the system to be connected as a peripheral for some or all of its functionality to be available.

(Separate device for system/game UI) In some implementations, the game system can be coupled to a device (game system, computer, mobile device, etc.) such that the coupled system can present a user interface to control the game system and/or a game played on the game system.

(Each player using his own device/display screen) In some implementations, each player or team uses one or more devices (game system, computer, mobile device, etc.) that are coupled to the game system and are used during game play. Coupled devices may display game information that does not fit on the game board. Coupled devices may display game information that is known to the player or team using the device but is not necessarily known to all players or teams. In some implementations, coupled devices are used for user interfaces to allow players to control the game and/or game system.

Coupled System Implementations (Game system provided local web application) In this implementation the game system provides a web application that devices can access to interact with the game system. The web application presents a user interface to the user, which may be used to control the game system and/or interact with the game being played. The game system can provide APIs for the game running on the system to present UI elements through the web application and receive user interactions with those UI elements. In some implementations, the local network connection to the game system is through a network that the game system also uses to connect to the internet. In some implementations, the local network connection to the game system is through a local network provided by the game system, such as the game system providing a Wi-Fi network for devices to connect to.

(Game provided local web application) In this implementation the game running on the game system provides a web application that is specific to the game, which users can access through a local network connection. The game system takes care of providing access to the game's web application, which can be through a network that the game system is connected to, or a local network that the game system creates to allow devices to connect to access the web application. Devices connected to the game's web application will present the web application to players, who can interact with the web application's UI as part of their game play.

(Game system provided cloud web application) In this implementation the network that the game system connects to provides a web application that devices can navigate to in order to interact with the game system, which might present UI elements from games played on the system. When a device connects to the web application provided with the game system network, it will need to be linked with the game system that the user is playing on, which also connects with the game system network. This can be accomplished by asking the user to enter a code that is displayed on the game system they are trying to link to. The linking of a device to a game system can be stored in a cookie in the device's web browser so that the device does not need to be linked to the game system each time it is used. In some implementations, the web application provided by the game system is accessed through a server that both the game system and the device the player is using to access the web application both communicate with, such as through internet connections. Such an implementation allows two devices that can not address each other, such as a game system on a Wi-Fi connection and a mobile device on a wireless data network, to communicate with each other even though neither accepts incoming traffic from the network that the other is on. In such an implementation, a code provided by the game system can be used to pair devices connecting to the server with the web application provided by that game server.

(Game provided cloud web application) In this implementation a network supporting a particular game being played on the game system provides a web application that devices can navigate to in order to interact with a session of that game being played on the game system. Players accessing the web application link to the game session they are playing, which can be accomplished by entering a code displayed by the game session.

(Game system provided device application) In this implementation a device application provided by the game system is installed on a device to allow that device to be used as part of the game system. This is similar to accessing a web application provided by the game system network except that the code running on the device is an application provided by the game system instead of a web browser. This has the advantage that an application running on a device has more access to the device's capabilities, such as camera and microphone, than if the UI were running in a web browser. This has the disadvantage that some players will be reluctant to install an application on their device due to concerns over privacy, security, code incompatibilities, resources used by the application, or the hassle of installing an application.

(Game provided device application) In this implementation a device application provided by the network used for a particular game, or company providing a plurality of games, is used to present a UI for a game session on a device. This is similar to a using a web application provided by a game network to provide the UI except that the code running on the device is an application provided by the game system instead of a web browser.

Network Play (Synchronized network play) A hybrid game system can be advantageous for multiple players who are located in different locations. Such a system would allow all players to look at a game board that is set up the same. As a game piece is moved on one game board in a gaming session, the other game boards in the gaming session move the corresponding piece to the new location to have the game pieces on the other game boards positioned identically to the game board in which the piece was moved.

(Different game board for each player/team) Each player or team in a game session can use a separate game board. This has the advantage that the game board can display information that is specific to that player or team, such as the set of cards that the player has in their inventory, which is not known to other players or teams. Such an implementation would allow the game board to display the "fog of war" from that player or team's perspective, allowing them to see only the details that would be known by them in game, which will be different for different players or teams based on where their game pieces are located.

Interactions with Game System Network (Game system network general) In some implementations, the game system will communicate with a game system network, which manages online features for the device, such as user accounts, system updates, and game downloads. Games from the network can be saved locally on the game system device so that they are playable when the device is not connected to the network. Data, such as a game state save file, can be saved locally on the game system device when there is no network connection so that it can be synchronized to the game system network servers when the game system device is later connected to the network.

(Network game saves) The session state of game play can be saved to the game system network servers such that it can be retrieved to allow the player to resume play from that point. In some cases, the player will login to a different game system device, which will be able to download their saved state from the game system network servers to that device based on the fact that they are logged into their game system account on that device. When resuming the state of a saved game, the game system device can move the game pieces into the positions they were in when the game state was saved.

eSports Integration (Distributed eSports game matches/tournaments) eSports tournaments can be played using game system devices, which will allow players in different locations to see a board where the game pieces are in the same position as the board that one or more other players in one or more other locations see. eSports tournaments are often played in a large arena where there are large cash prizes. By playing on game system devices, it allows game tournaments to be played without requiring the expense and logistics of gathering everyone in the same arena to see the location of pieces on the game board. A growing list of games that are played in eSports tournaments, and a hybrid game system can enable a new class of games to be played as eSports games.

(System as an eSports viewing device) In some implementations, the game system device can synchronize to a game match played on another game system device. In such case, the game system will not only display what the other game system is displaying but will move game pieces on its board corresponding to the movements of game pieces on the other board. Such a system can be used as a viewing device for spectators of eSports matches that are played on one or more game system devices. The viewing of an eSports game match or tournament on a game system device can be accompanied by other coverage of the eSports game match or tournament, such as viewing programming on one or more television or mobile device. In some cases, the eSports coverage that is displayed can be controlled by the viewer, such as showing game renderings for a favorite player, showing commentary from a favorite commentator, or triggering a replay of action that previously happened. Having spectators view game matches on a game system device can allow game pieces to be sold to spectators who might not even play the game. Such spectator game pieces may be customized with the colors and/or logos of particular players or teams. In some cases, a spectator may use multiple game boards for viewing an eSports match such that each game board can correspond to the game board for a different team or player.

(Online streaming) Subscribers to an eSports service can use the board to practice, stimulate, and replay games. In some implementations, games can be replayed in 3D levitated space with the ability to rotate the views in 360 degrees. Using the cameras, games can be streamed or re-streamed via network game or video streaming services to spectators or viewers.

In some implementations, the state of pieces on a game board can be broadcast along with footage of a game match so that eSports viewers can have a game board at their viewing location replicate the positions of the game pieces on the board of the game board used in the game match being viewed. Such game state metadata can be stored with the video footage of the game match so that it can be utilized in viewing a playback of the game match. Such game metadata can be used in conjunction with pieces that can display an image to have a generic set of game pieces used to represent a wide variety of game pieces. For example, a rectangular game piece that can display an image can represent a card in a game match, even if the image of the card used in the game did not exist when the game piece was made.

Figure 30:
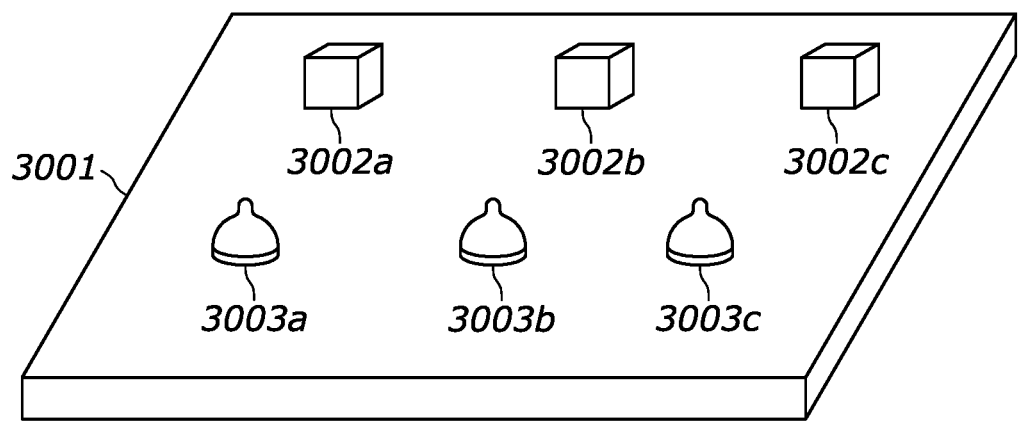
FIG. 30 illustrates real and virtual game pieces.
Figure 31:
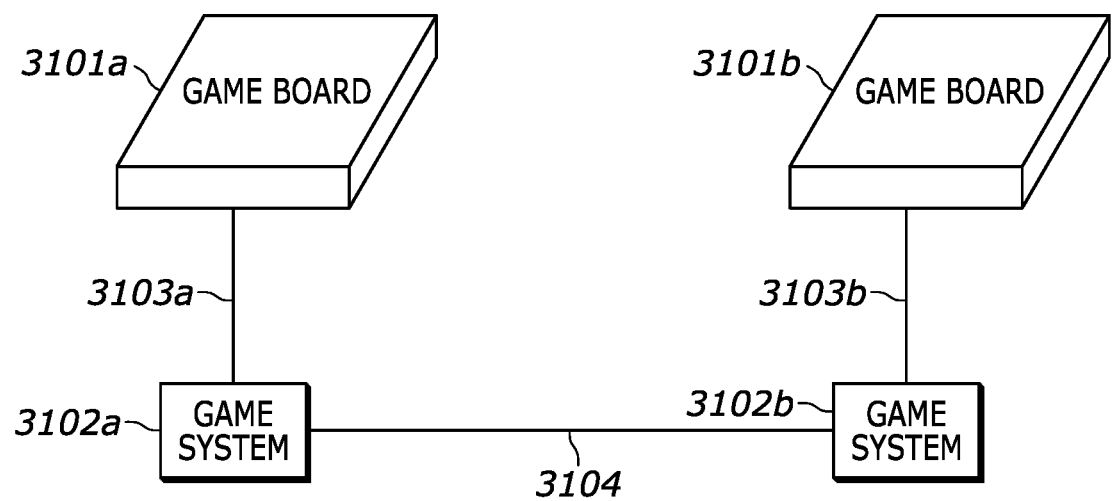
FIG. 31 illustrates communication between multiple game boards.

Prior to turning to FIGS. 16-30, additional principles of communication between multiple game boards is illustrated in FIG. 31, which shows a configuration in which more than one game board is used simultaneously. More specifically, first and second game boards 3101a and 3101b can be used simultaneously for coordinated game play. The first game board 3101a is controlled by a first game system 3102a through a first connection 3103a while the second game board 3101b is controlled by a second game system 3102b through a second connection 3103b. The game systems 3102a, 3102b can be in the form of dedicated hardware, a general-purpose computer, a game console, or other consumer electronics device.

While FIG. 31 shows two game boards, more than two game boards can be used simultaneously. A communication link 3104 between the game systems 3102a, 3102b can be established using any type of communication protocol, such as Wi-Fi, LAN, or Internet. Communication between the game boards and the game systems can be established in a variety of ways, such as dedicated wiring, Wi-Fi, or connecting both the game board and game system to a communication network. Not all game boards used in the same game play need to be connected to a respective game system using the same method. For example, the first game board 3101a for use by a first player may be physically connected to a game console that acts as the game system 3102a, while the second game board 3101b for use by a second player may be located in an adjacent room to keep the players from seeing each other's game boards and can be connected to the first game system 3102a through Bluetooth. In some implementations, the communication between game systems is accomplished by having the game servers communicate with a computer or network service.

In some implementations, multiple game boards can be connected to the same game system. The connected game board can have multiple levels of the same game being played at the same time and may have different orientations relative to each other (e.g., one may be horizontal and the other vertical). In some implementations, game boards are attached to game systems as a type of peripheral. In some implementations, the first game system 3102a is built into the same physical hardware as the first game board 3101a. In some implementations, a player can play using more than one game board at a time. For example, a player may have three game boards positioned above each other to represent three levels in a building that is part of the game play. When a player uses multiple game boards for game play, that game play may be linked with game play on one or more other game boards.

In some implementations, the first game board 3101a can have a game played on it, while the second game board 3101b can be used passively to watch the game play on the first game board. In such a case, the activities at the second game board 3101b are not part of the game play, even though the game boards both show the same game play. The game play can use game boards in addition to the first game board 3101a, in which case, the game boards that are connected to show the game play can be configured to match any of the game boards on which the game is played. Many additional game boards can be configured to show the game play on the same first game board 3101a. This can be useful for spectating game play, such as having viewers in many locations watch the same eSports game match.

When a game piece is placed or moved on the first game board 3101a, the same game piece movement automatically can be performed on the second game board 3101b. In some cases, the second (coupled) game board 3101b may not have an appropriate game piece to use, in which case the coupled game board 3101b can display a proxy of the game piece on its display in the location where the game piece would be located.

In some implementations, the first and second game boards 3101a and 3101b show the same game play area for the same game session in which a first player or team interacts with the first game board 3101a while a second player or team interacts with the second game board 3101b. The first and second game boards 3101a and 3101b may be located within close proximity of each other or may be located remotely from each other. Such an implementation can be useful for playing with someone who does not live nearby. The first and second game boards 3101a and 3101b can move game pieces and adjust their displays to keep what is seen on each game board the same, or the game boards may customize what is shown on them to the player or tram using the game board, such as displaying information known only to the player or team using the game board.

In some implementations, a player playing on the first game board 3101a can see a portion of the game pieces that a player placed on the second game board 3101b but might not see all of the game pieces placed on the second game board due to the rules of the game. Such a configuration allows multiple players or teams to play with their own game boards, which may be customized to what the respective players are allowed to see in-game, while still representing the same game session that the other players are playing in.

In some implementations, game boards and/or game systems have the ability to transmit and play audio streams which allow players playing on game boards in different locations to hear each other. This can be accomplished by having one or more microphones and one or more speakers associated with the game board and/or game system. This can be accomplished by having a game board or game system that is able to connect to one or more headsets by using a wired or wireless connection. This audio ability may be combined with the ability to transmit and play video streams. A game board or game system can connect to one or more cameras and one or more displays to provide the video connectivity. The video of other game players may be shown on a portion of a display that is part of the game board. In some implementations, audio and/or video conferencing between players at different game boards can be provided through devices that the game boards or game systems connect with, such as tablet computers, smart phones, speaker phones, or video conferencing systems. In some cases, the game systems 3102a, 3102b transmit the audio and video data with the game data. In some cases, the audio and video data are transmitted separately than the game data, such as through a telephone call, a network connection, or by having the game systems connect to a server that the game data is not routed through. In some implementations, the audio and/or video data is recorded with the game state data to allow for playback at a later time.

The game system can allow game pieces to be locally or remotely controlled via the Internet. Since each game piece can be moved independently, a user can control one or more game pieces either locally or remotely. This enables multi-player gaming experiences where players use multiple game systems while playing the same game match. In some implementations, one or more second display devices such as a tablet computer, mobile computer, laptop, etc. to participate by playing a portion of a game, spectating, providing commentary, viewing the game play from one or more embedded cameras, etc. may be provided In some instances, second display players can help the primary players to perform tasks to level up or achieve a certain level of game play.

Game Board as Display

Figure 16:
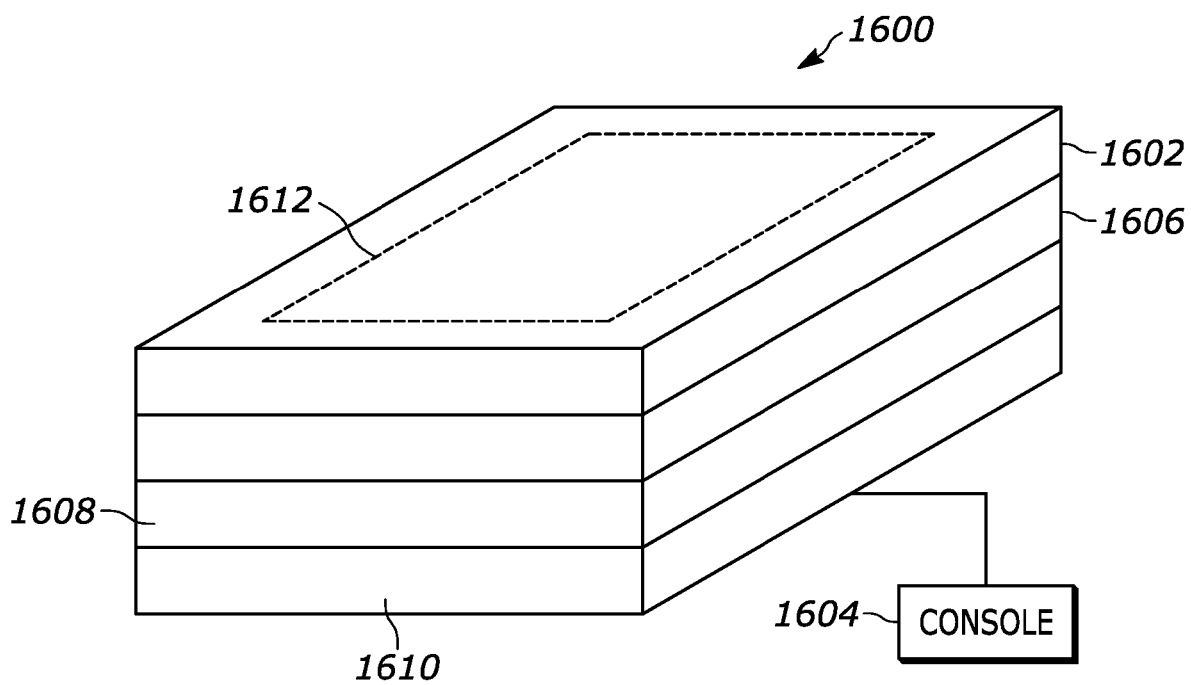
FIG. 16 illustrates a game board configured as a computer-type display.

Referring now to FIG. 16, a game board 1600 may be implemented by a computer display with an active display layer 1602 such as liquid crystals or light emitting diodes (LED) that can present demanded images from, e.g., a computer game console 1604. A touch sensitive layer 1606 also may be provided to render the game board 1600 touch-sensitive, allowing users to interact with the system and game UI through touching and/or hoovering over the game board 1600. The game board 1600 may implement a 3D display to allow portions of the display to look higher than others, such as hilly terrane or tokens displayed on the board that appear to be raised from the surface of the board as physical tokens would.

The game board 1600 also may include an electromagnet grid layer 1608 and a ferrous backing 1610 to allow game pieces with magnets in their base to stay in place on the game board when the game board is not in a horizontal position, such as using a display mounted on a wall as a game board. Such an implementation would be good for a mobile game system, where the game system is likely to be moved while the game is in progress.

By using a display screen (LCD, LED, OLED, e-Paper, etc.) as a game board instead of a statically printed board, additional features are provided that are not otherwise available or not as easy with a traditional board game while still having the experience of playing with physical game pieces that many people who play board games enjoy. Some advantages include being able to use the same game board for multiple games, automatic reconfiguration of the game board, presenting high definition visuals, such as animations, on the game board as well as status that can be updated automatically, using the game board as a UI for controlling (inputting player commands) a computer game system implemented by, e.g., a computer game console, and using the game board for a game UI to allow things such as game configuration.

FIG. 16 also shows that the display portion of the game board may be covered by a protective layer 1612 such as transparent glass, acrylic, or plexiglass to protect the game board from things being placed on top of the game board and moved around. The protective layer 1612 can be replaced if it should become worn or damaged, which can restore a highly used game board to looking like new. The protective layer can also protect against things such as spills or cleaning chemicals. The layer 1612 can include circuitry for additional lightning, visual effects, etc. and extend itself to an accessory market where owners and/or manufacturers can make protective layers and sell them.

In some implementations the game system executed by the console 1604 can provide a private playing area where a player or team can place game pieces that is out of view of other players or teams. The game pieces played in such an area are part of game play, and the game system enforces their effects on the game without needing to reveal the game pieces to other players or teams. This has an advantage over traditional board games in that the effect can be enforced by the game without other players needing to see what was played. Game pieces played in such an area may be generic game pieces that do not indicate their characteristics when played in the area, allowing the game piece to be in view of opponents without revealing exactly what was played, such as a card game piece that displays an image of the back side of the cards when played to correspond to a card that is played face down. In some implementations, a cover can be used over an area for private game play to keep the pieces played in that area out of view of other players. In some implementations, each player or team has a separate game board for playing pieces that should be kept private from other players, which may have a cover or other barriers to keep the game area out of view. A private playing area can be on a display board or statically printed board. A display board can allow for more dynamic choices, such as providing different areas in which game pieces can be played for different game effects. A private playing area can have sensors under the board or can use cameras or other means to determine what was played in the game area. Dice can be rolled in a private playing area such that their effect on the game can take place without having to reveal the result of the roll. Such a system can be advantageous which an opponent can tell right away if a roll was "successful" or not, but if the roll was particularly high or particularly low the roll might have an effect in addition to the success/fail determination that might not be immediately obvious to other players or teams. In some implementations, a private playing area can be built with another playing area above the private playing area such that the other playing area is visible to other players or teams, but the private playing area is not visible.

Elevator/Arm to Remove/Replace Game Pieces

Figure 17:
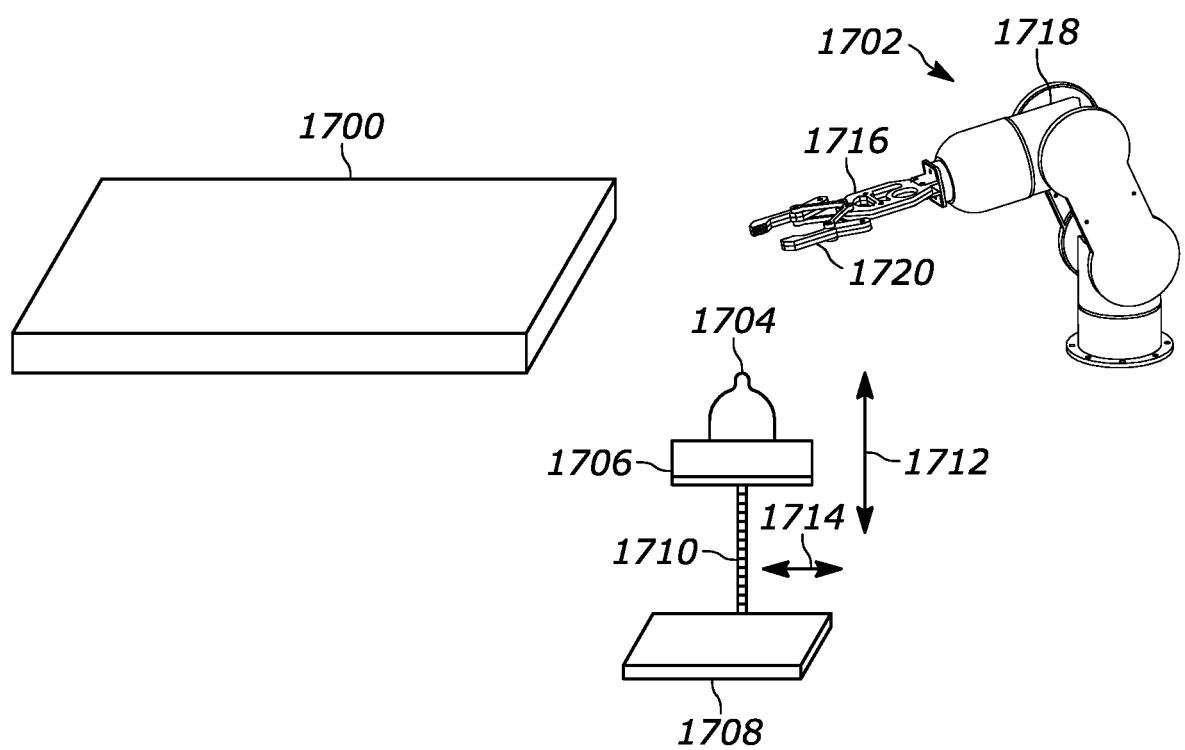
FIGS. 17 and 18 illustrate devices for moving game pieces onto and off of game boards.

FIG. 17 illustrates an elevator system to allow for automatic movement of game pieces on and off of a game board 1700. In addition, or alternatively, a robotic arm 1702 may be provided for automatic movement of a game piece 1704 on and off of the board 1700.

Beginning with the elevator system, one or more platforms 1706 adjacent to the game board can move up and down to allow transportation of game pieces 1704 from the game board level to one or more other levels. There can be another board 1708 below the game board 1700 that acts as a sideboard for pieces that are part of the game session, but not on the game board at the time. Such a sideboard 1708 may be implemented the same as the game board or might be implemented with a different configuration of features, such as not having the display portion of the game board, but still having the game piece sensing and magnetic game piece movement. An elevator 1710 such as a motor-drive rack-and-pinion or a hydraulic/pneumatic cylinder couples the platform 1706 to the sideboard 1708 for vertical motion of the platform 1706 (and, hence, game piece 1704) as indicated by the arrows 1712. The elevator 1710 may also be slidably mounted on the sideboard 1708 for movement by a motor for example in the horizontal dimension indicated by the arrows 1714.

Turning to the robotic arm 1702, it may include three segments 1716 (or more or fewer) pivotably coupled to each other at movable joints 1718 to automatically move game pieces on and off of the game board. To this end, the distal segment 1716 may terminate in a gripper 1720. Such a system can be advantageous when synchronizing multiple game boards, so that when a player places a game piece on one game board, the other game boards can use a robotic arm to place the same game piece to allow the boards to all end up in the same state. In some implementations, the robotic arm can place the game pieces in known locations when they are not on the game board. In some implementations, when the robotic arm places a piece on the game board, the game board detects the game piece and ensures that it is the correct game piece.

Figure 18:
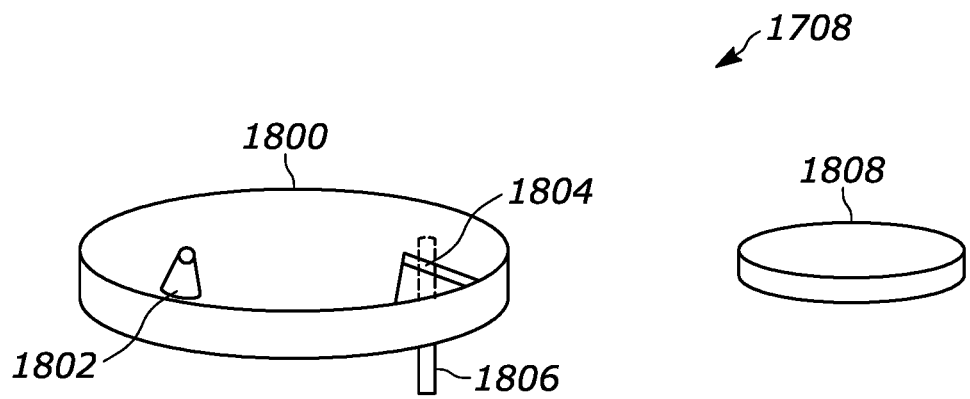
Figure 19:
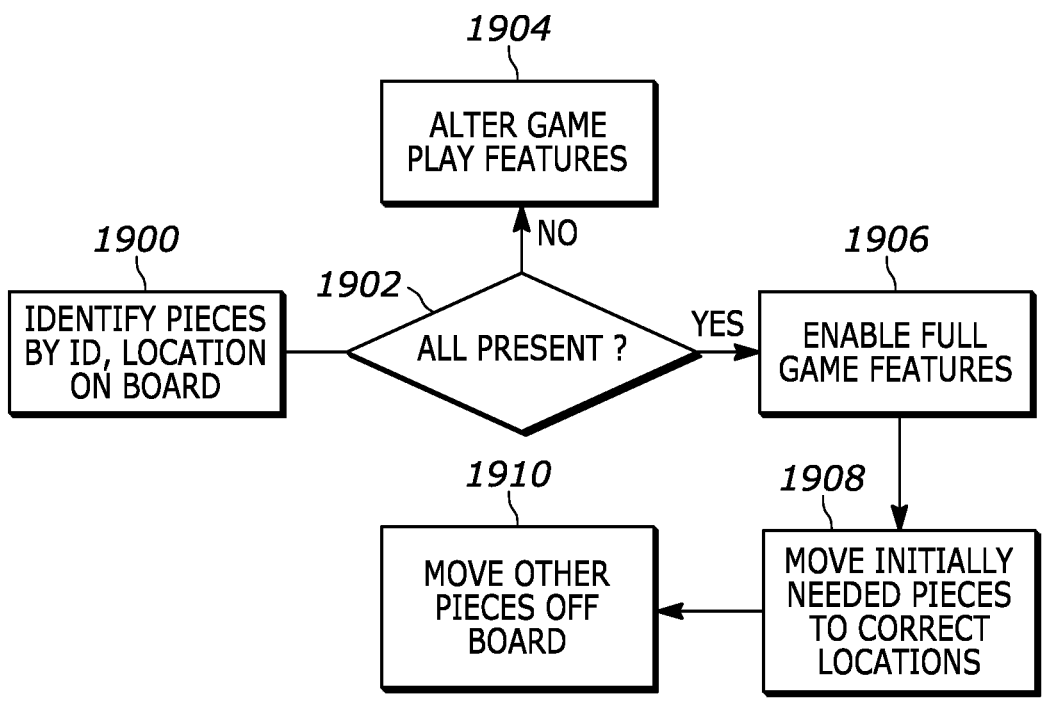
FIGS. 19 and 20 illustrate example automatic game piece placement logic in example flow chart format.

In some implementations as shown in FIG. 18, the game piece sideboard 1708 is implemented by a rotating storage disk 1800 that spins until the desired game piece 1802 or empty slot 1804 is lined up with the game elevator 1806. Such a rotating mechanism may have multiple levels. Such a storage may use magnetic fields to move pieces on and off of the elevator platform 1800, or may use another mechanism, such as physically pushing pieces, which may be easier to implement as only a single set of pushers would be needed to push pieces on and off of the elevator, and no sensors would be needed as well. Such a system may also be used to rotate the sideboard such that the desired storage area is within reach of a robotic arm. In some implementations, the game piece sideboard 1708 is placed adjacent to the game board so that game pieces can be moved directly between the sideboard and game board without needing a game elevator 1806.

In some implementations, one or more additional game boards 1808 can be placed adjacent to a game board that is being used for game play. If the game boards have very small, or removable, bezels, it will allow the system to move game pieces from one game board to the other by sliding them off of the edge. This will allow one or more game boards to be used as a sideboard for storing game pieces that are not currently in play on the game board at the time.

In some implementations, a section of the main game board 1700 can be used as a sideboard to store game pieces that are not currently in play on the game board at the time. Since the system can move pieces on the game board, it allows the game system to automatically move pieces in and out of play by moving them in or out of the sideboard area.

In some implementations more than one game board 1700 can be used in the same game session. These game boards may be spaced vertically at different levels to provide different levels, such as floors in a building in which a game is taking place. These game boards may also be placed with other orientations, such as each on a separate table.

Prior to turning to FIGS. 19-26, additional principles of game piece movement are illustrated in FIGS. 27-30.

Figure 27:
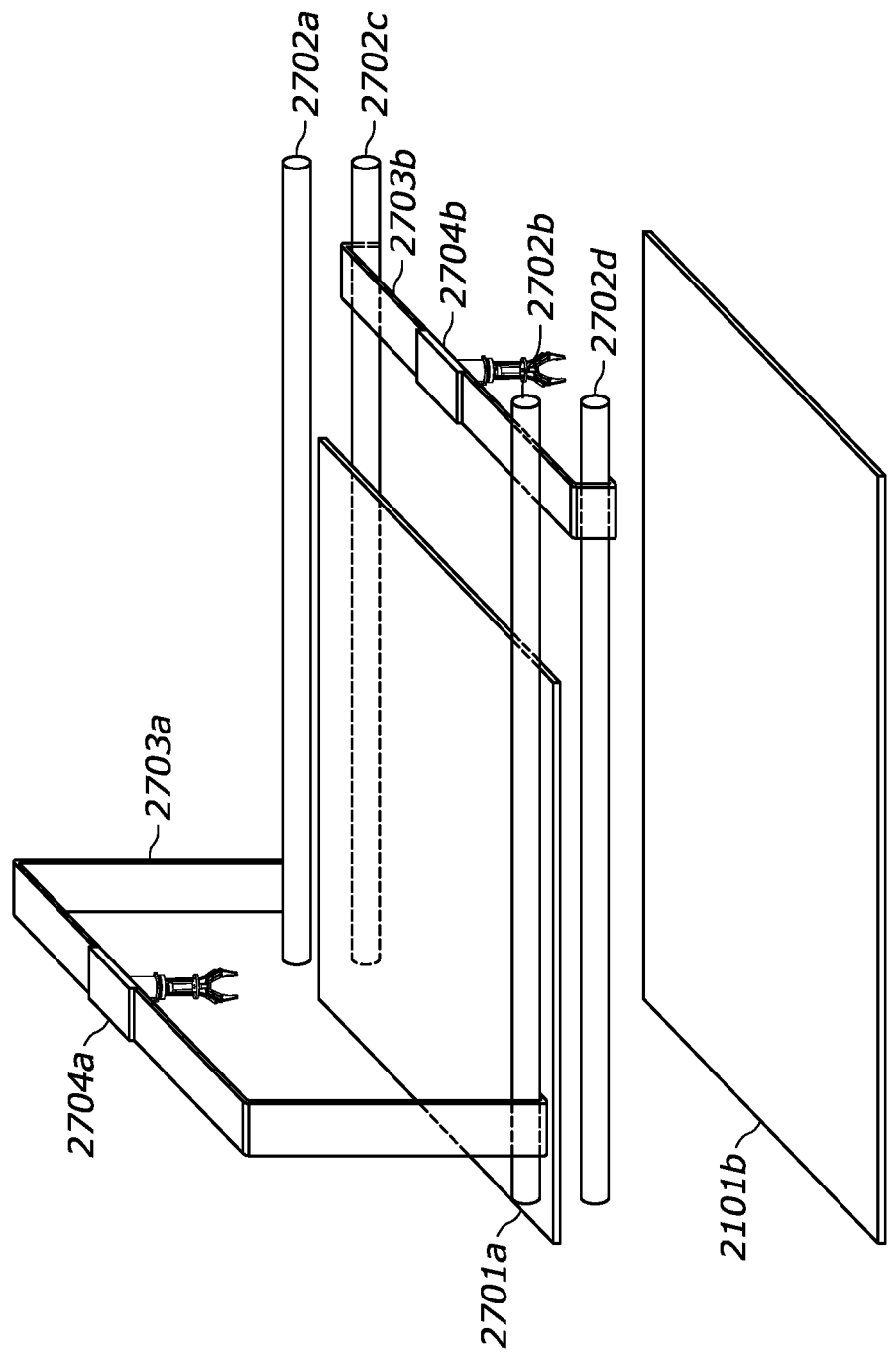
FIG. 27-29 illustrate additional devices for moving game pieces on and off game boards.

FIG. 27 shows a game system implementation that uses robotic claws to move game pieces. Elements 2701a and 2701b are surfaces on which game pieces can be placed. While FIG. 27 shows a game system with two surfaces, a game system may have one or more surfaces 2701 on which game pieces can be placed. Each surface 2701 may be a game board surface, a game piece storage surface, have areas dedicated to both, or change based on the game being played. Each surface may have any number of game system features, such as sensors, an electromagnetic grid, or display screen. Combining a feature to mechanically move game pieces with an electromagnetic grid allows the electromagnetic grid to handle the movement of game pieces with ferrous or magnetic elements, while the mechanical mechanism can handle the movement of other game pieces, such as solid wood game pieces. Having a display screen on a game piece storage surface can be useful to show characteristics of game pieces stored on the surface, such as which player owns the pieces on a portion of the surface, or the type of unit on a portion of a surface. This can be helpful when putting away game pieces at the end of a session as well as making it quick to see what game pieces are on the storage surface during game play, such as where game play is limited to the inventory of game pieces the game is being played with.

FIG. 27 shows a claw mechanism 2704a to move game pieces on a first game surface 2701a and a claw mechanism 2704b to move game pieces on a second game surface 2701b. The claw mechanisms 2704 can be raised and lowered to move game pieces, as well as opening and closing the claw to grip the game pieces. In some implementations, the claw can be rotated to turn the orientation of the game pieces. The number of claw mechanisms 2704 does not need to be equal to the number of surfaces 2701. In some implementations, one or more surfaces 2701 will not have a corresponding claw mechanism, in which case the surface may have an electromagnetic grid for moving game pieces. In some implementations, a claw mechanism 2704 is configured so that it can move game pieces on more than one surface 2701. In some implementations, more than one claw mechanism 2704 is configured so that it can move game pieces on the same surface 2701. In such an implementation, more than one claw can be used simultaneously to move multiple game pieces at the same time.

The first claw mechanism 2704a is mounted on a first movable arm 2703a and the second claw mechanism 2704b is mounted on a second movable arm 2703b, such that the claw mechanisms 2704a, 2704b can move side to side on the respective movable arms 2703a, 2703b to change orientations of the claw mechanisms 2704 with respect to the surfaces 2701a, 2701b. The first movable arm 2703a is mounted on rails 2702a and 2702b and the second movable arm 2703b is mounted on its own rails 2702c and 2702d, such that the movable arms 2703a, 2703b can move along the respective rails to change the orientations of the claw mechanisms with respect to the surfaces 2701a, 2701b. The first movable arm 2703a is shaped to be raised up from its respective rails 2702a and 2702b on which it moves to allow clearance to pass over the game pieces on the surface. A movable arm may be telescoping to allow for the height of the arm to change. The second movable arm 2703b is straight as it is mounted on rails at the desired height for the arm to move. While FIG. 27 shows a single rail on each side of a respective surface, other configurations are possible. In one implementation, the rails 2702a and 2702b can both be located along the back side of the first surface 2701a, in which case the first movable arm 2703a would extend up from the back side of the game board and would then extend out over the first surface 2701a to provide the portion of the arm in which the first claw mechanism 2704a moves. The first movable arm 2703a can be hinged to allow the arm to be moved up when it is not in use so that it does not extend out over the first surface 2701a and block the player's line of sight to the surface. Each movable arm can be mounted on one or more rails.

FIG. 27 shows the second surface 2701b under the first surface 2701a and being longer than the first surface, extending from under one end of the first surface 2701a. Any combination of shapes, sizes, and alignments of surfaces on which game pieces can be placed are possible. By having the second game surface 2101b protrude out from under the first game surface 2701a, the first claw mechanism 2704a can pick up a game piece on the first surface 2701a and place it on the portion of the second surface 2701b that protrudes, or it can pick up a game piece on the portion of the second surface 2701b that protrudes and place it on the first game surface 2701a, thus moving game pieces from one game surface to another.

Figure 28:
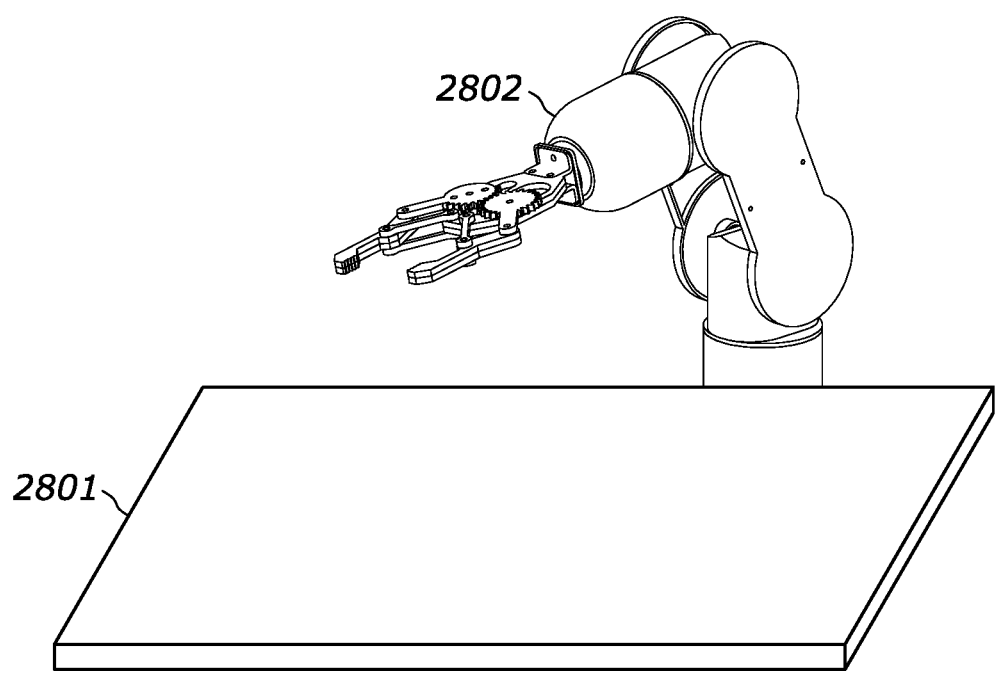

FIG. 28 shows a game system that uses a robotic arm 2802 to move game pieces on a surface 2801 on which game pieces can be placed. A game system may have any number of robotic arms. The robotic arms 2802 can be used in conjunction with other mechanisms for moving game pieces, such as electromagnetic grids.

Figure 29:
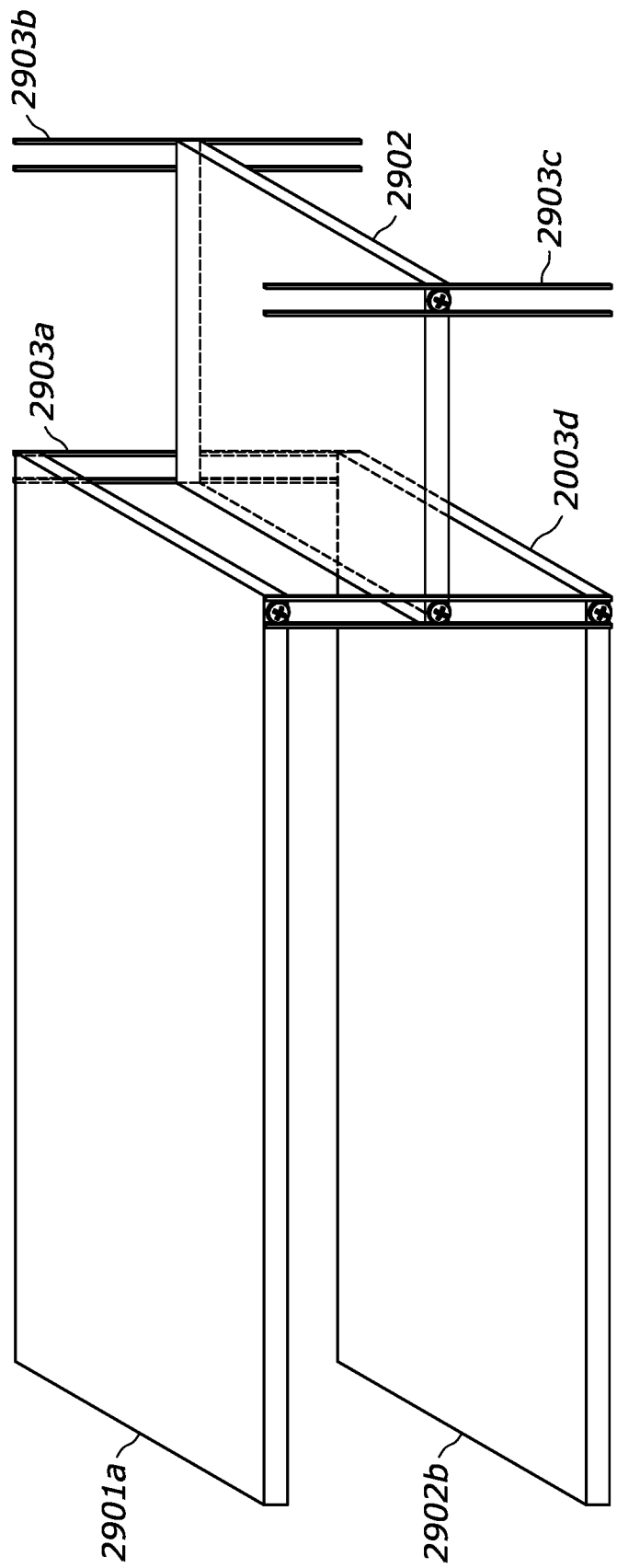

FIG. 29 shows an elevator platform 2902 that is used to move game pieces between a first game surface 2901a and a second surface 2902b. A game system can have any number of surfaces and elevator platforms, which can be configured in a wide variety of shapes, sizes, and arrangements. In some implementations, there are multiple surfaces at the same level such that game pieces can be moved between the surfaces and the elevator platform 2902 when the elevator platform is at the same level as the surfaces.

The elevator platform 2902 is mounted on four rails 2903a-2903d that allow the elevator platform to move between the levels of the surfaces 2901a and 2901b. While FIG. 29 shows the rails 2903a-2903d at a 90-degree angle to the surfaces, other orientations are possible. While FIG. 29 shows one rail at each corner of the elevator platform, other configurations are possible, with each elevator platform being attached to one or more rails. In some implementations, multiple elevator platforms are attached to the same rail.

The movement of the elevator platform 2902 can be controlled in multiple ways. In one implementation, one or more rail 2903a-2903d is shaped as a screw, and as the screw turns, the elevator platform 2902 has a protrusion into the grove of the screw causing the platform to move up and down. If an elevator platform is coupled to more than one screw, the screws can be mechanically coupled, such as with gears and shafts, so that the screws move in unison to keep the platform aligned correctly. In one implementation, one or more rails has a guide, such as a belt or chain, that travels along the rail where that the elevator platform 2902 is attached to the guide and moves up and down as the guide is moved. In one implementation, the elevator platform 2902 has one or more gears or wheels in contact with one or more guides 2903, such that when the gear or wheel is turned it moves the platform 2902 in relation to the guide 2903.

Multiple mechanisms can be used to move game pieces between a surface 2901 and an adjacent elevator platform, such as electromagnetic grids, robotic arms, or movable mechanisms that push pieces. The same mechanisms can be used for all movement, such as having an electromagnetic grid under all surfaces 2901a-2901b and elevator platforms 2902. In some implementations, more than one mechanism for moving game pieces is used in the same game system. For example, a game piece can be moved to the edge of a game board surface 2901a, 2901b using an electromagnetic grid, then a movable mechanism can physically push the game pieces in that area of the grid onto an elevator platform 2902. The elevator platform 2902 then moves to another level, where a movable mechanism physically pushes the game pieces off of the elevator platform onto another surface, where another electromagnetic grid is then used to position the game pieces on the other surface.

FIG. 30 shows a game board 3001 with game pieces first through third 3002a-3002c placed on the game board and fourth through sixth game pieces 3003a-3003c displayed on the game board 3001 by a display screen that is part of the game board 3001. The first game piece 3002a is a game piece that is controlled by a player and was physically placed on the game board 3001 by the player. The fourth game piece 3003a is a game piece that is controlled by a player and was virtually placed on the game board 3001 by the player and is displayed by the game board's display screen. The second game piece 3002b is a game piece that was physically placed on the game board 3001 by the game system. The fifth game piece 3003b is a virtual game piece that was placed on the game board by the game system and is displayed by the game board's 3001 display screen. The second and fifth game pieces 3002b and 3003b may correspond to fixed items of the game, such as walls or statues, or may correspond to movable game assets, such as treasure chests or non-player characters (NPCs), which may or may not be located where they are because of actions of a player.

The third and sixth game pieces 3002c and 3003c correspond to game pieces on a remote game board 3001' on which the same game is being played. The remote game board 3001' may be in close proximity to the local game board 3001 or may be located remotely to the local game board 3001, such as in a network game. The remote game board 3001' may be connected to the same game system as the local game board 3001, may be connected to a remote game system, or may be part of a stand-alone game system.

The third physical game piece 3002c may correspond to a physical game piece on the remote game board 3001' or it may correspond to a virtual game piece on the remote game board 3001'. One case in which the third physical game piece 3002c would correspond to a virtual game piece would be where the player using the local game board 3001 owns an appropriate physical game piece such as the third game piece 3002c to represent an item in the game while the player using the remote game board 3001' does not own an appropriate physical game piece to represent that item, in which case the game system would use a virtual game piece that is shown by a display screen.

The third game piece 3002c may correspond to a physical game piece on the remote game board 3001' or it may correspond to a virtual game piece on the remote game board 3001'. One case where a virtual game piece may be used on the local game board 3001 to represent a physical game piece on the remote game board 3001' would be where the visibility of the game piece to the player using the local game board 3001 changes depending on the players field of view, potentially causing the virtual game piece to appear and disappear as the player's field of view changes. The player using the remote game board 3001' may have physically placed the corresponding game piece on the board so that it does not need to be hidden from that player as their field of view changes.

In some implementations, game state metadata, such as the positions of game pieces and what is shown on the game board display, is broadcast or recorded along with footage of a game match so that eSports viewers can have a game board at their viewing locations replicate the positions of the game pieces on the board of the game board used in the game match being viewed. Such game state metadata can be stored with the video footage of the game match so that it can be utilized in viewing a playback of the game match. Such game metadata can be used in conjunction with pieces that can display an image to have a generic set of game pieces used to represent a wide variety of game pieces. For example, a rectangular game piece that can display an image can represent a card in a game match, even if the image of the card used in the game did not exist when the game piece was made.

Automatic Game Setup

Returning to FIG. 19, logic is illustrated for automated game setup in which game pieces are initially placed on the game board. Commencing at block 1900, the system detects what and where each game piece is. Moving to decision diamond 1902, the pieces can be inventoried and if not, all pieces are present the logic moves to block 1904 to alter features of ensuing game play to require only those pieces that are available. Otherwise, full game play features are enabled at block 1906. In some implementations, virtual game pieces are used in place of physical game pieces when the game requires a game piece and there is no physical game piece present to be used for the required game piece.

Moving to block 1908, the logic automatically places initially needed game pieces in their initial locations on the board before start of play. At block 1910, pieces that are not initially required are moved off of the game board and can subsequently be automatically brought back onto the game board when needed during game play. In some implementations, the initial locations for game pieces are determined by their locations in previous game play, such as if the state of a game were saved, and playback is to resume from the saved game state.

Figure 20:
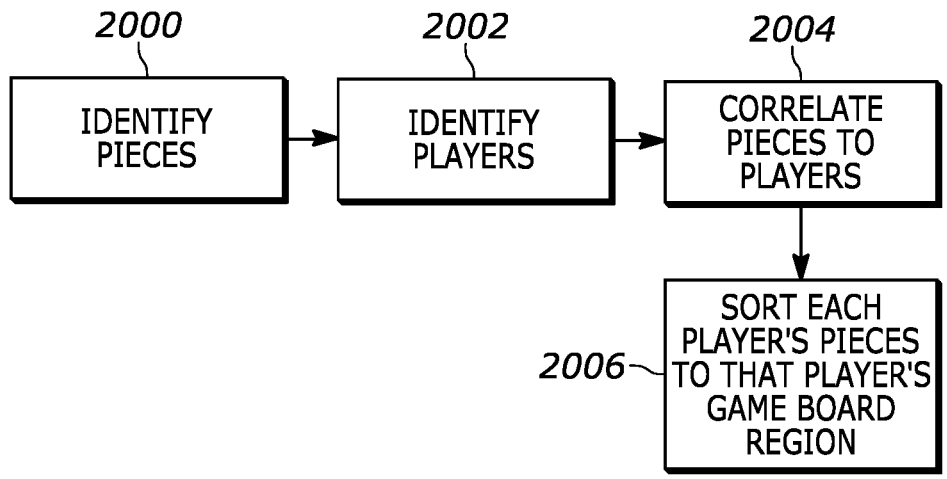

Now referring to FIG. 20, at block 2000 game pieces are initially identified. Proceeding to block 2002 players are identified by, e.g., username, face recognition, assigned game role, or other means. Moving to block 2004 the pieces are correlated to their respective players by correlating player roles to the pieces each role is associated with. Then, at block 2006 the game pieces are automatically moved to game board regions corresponding to their respective player typically at the beginning of a game to divide game pieces by player so that each player starts with the correct set of game pieces. This can also be useful at the end of a game where each player brought game pieces that they own, such as in a game with collectable game pieces, where the game system can quickly sort the game pieces based on who owns each piece.

Accordingly, FIG. 20 implements a game system in which each player may place the game pieces he will be playing with on the board as part of the setup process. The game system identifies these pieces as being used by that player in the game, moving pieces out of the way as necessary to allow other players to place their pieces on the board. Each player can place his respective pieces on a particular portion of the game board to allow the game system to associate those game pieces with that player to allow players to place their game pieces in play at the same time without having to wait for other players to finish putting their game pieces in play. In some implementations, a player can place another game piece into play during game play by placing it in a particular portion of the game board, or by putting it in play during the player's turn in the game. Such a system can be useful in a game where physical game pieces are "drafted" by players, or where players bring their own game pieces to play with, which may be collectable game pieces.

Figure 21:
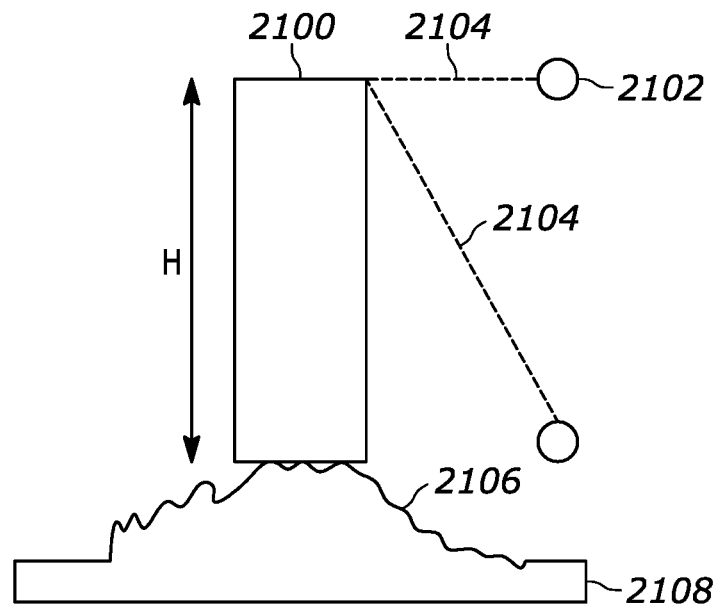
FIG. 21 illustrates components for determining the height of a game piece.

FIG. 21 illustrates that the height "H" of a game piece 2100 can be determined using one or more sensors 2102, such as radar or lidar sensors or acoustic sensors employing triangulation as indicated by the lines 2104. Triangulation may be effected by timing the round trip to get a response to a signal sent to the game piece. Knowing the height "H" is advantageous when playing a game in which game pieces may be placed on top of terrain or other platforms 2106 of a game board 2108 for situations in which the game system needs to know what level the game piece is on. In some implementations, terrain or other platforms can be used with the game system that do not include elements that interact with the game system to allow the game system to determine their location.

3D Printing of Game Pieces

Figure 22:
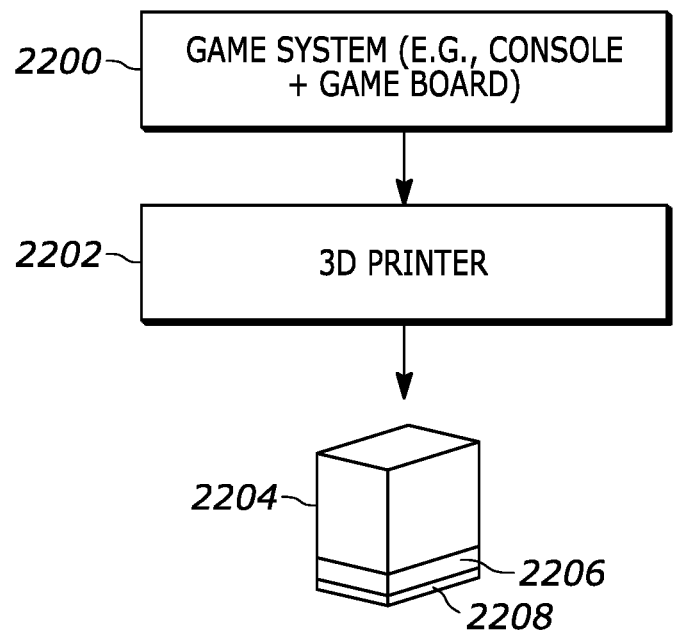
FIG. 22 illustrates a system for 3D game piece printing.

FIG. 22 illustrates that a game system 2200 (which may include, e.g., any of the game boards plus any of the game consoles described herein) that can communicate with a 3D printer 2202 to allow the game system to command the 3D printer to print 3D game pieces 2204 for the game. In some implementations, elements 2206 for tracking and/or magnetic movement are embedded in the base as the piece is printed. This can be accomplished by pausing the printing process after pockets in the base have been printed, in which case the user inserts game piece elements 2206, which might have an adhesive on them, into the pockets, then resumes the printing process to seal the game piece elements inside of the game piece. In some implementations, the 3D printing is started on top of a base that already has embedded elements for tracking and/or magnetic movement. In some implementations, elements for tracking and/or magnetic movement can be applied to the base of a 3D printed game piece after printing. Felt 2208 or other material may be applied to the base of a 3D printed game piece to allow smoother movement and less scratching.

Thus, printing may be implemented on a standard game piece base, magnetic/RFID/other elements can be embedded in the game piece 2204 while printing, pieces can be printed with a standard interface to allow then to connect to a base, and game interface elements can be added to a piece after printing. In some implementations, a 3D printed game piece can be placed on a standard game piece base to play with it and later removed from the standard game piece base so that the standard game piece base can be reused for another game piece, which may be 3D printed, or may be commercially made.

Game Piece Ownership

Figure 23:
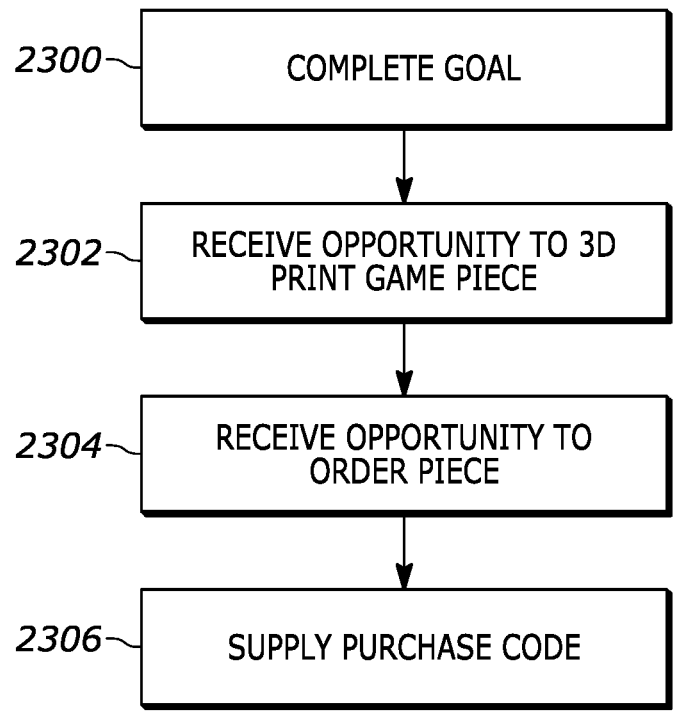
FIG. 23 illustrates example reward logic in example flow chart format.

FIG. 23 illustrates logic for allowing players to collect and play with collectable game pieces that they own, so that a game system can physically sort the game pieces by owner as described previously.

Commencing at block 2300, in one example a player achieves a goal such as completing a task in the game, winning player vs. player matches, or obtaining an item in-game as a random drop. Moving to block 2302, as a reward for achieving the goal the player may be accorded the opportunity to 3D print the game piece. In addition, or alternatively, as a reward for achieving the goal, at block 2304 the player may be accorded the opportunity order the game piece by, e.g., logging in to a game account. In addition or alternatively, as a reward for achieving the goal, at block 2306 the player may be allowed to purchase the game piece by providing a code supplied through the game, which may be fulfilled in an online order, or through a physical store.

Figure 24:
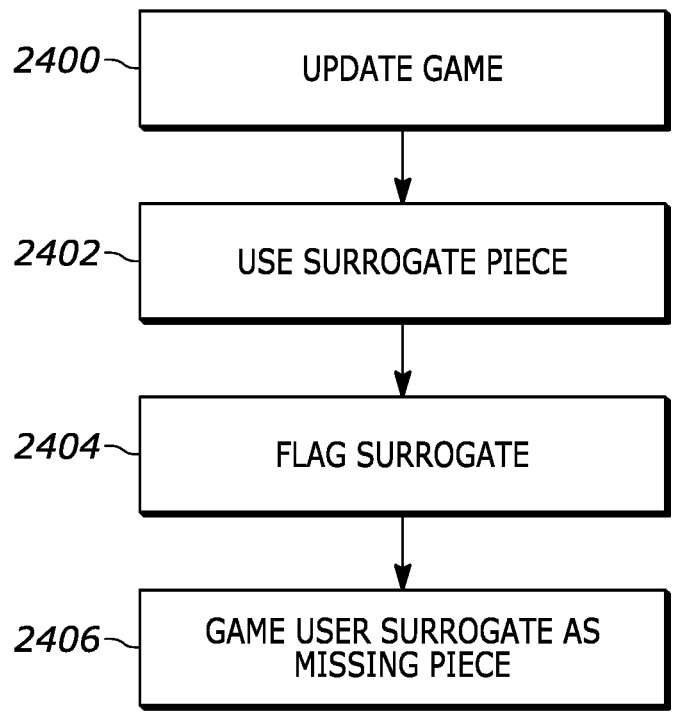
FIG. 24 illustrates example surrogate piece logic in example flow chart format.
Figure 25:
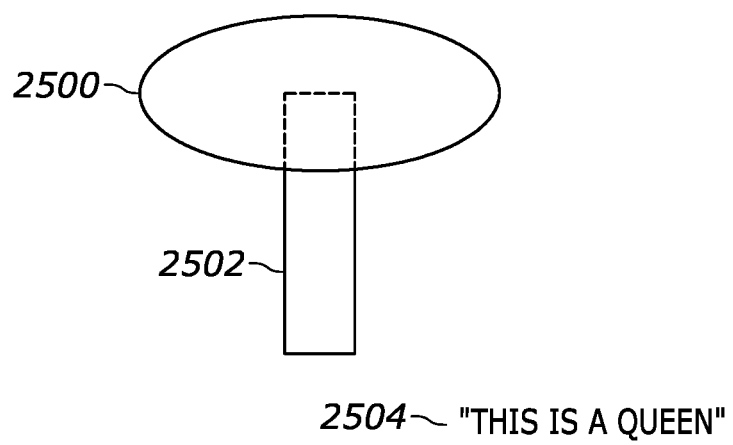
FIG. 25 illustrates a game board presentation of a surrogate game piece.

FIG. 24 illustrates that a player can be allowed to use an alternate game piece as a place holder for a physical game piece he does not have. For example, as indicated at block 2400, in an update of a game, a new creature may be introduced but the player who just downloaded the update may not have a physical game piece for the new creature. Proceeding to block 2402, the player may then use a different game piece, such as a pawn from a chess game, as a placeholder for the new creature. At block 2404 the player can indicate to the game system through the game UI or game system UI that the alternate game piece is being used as a place holder for the missing (new) game piece. Proceeding to block 2406 the game can then allow the place holder game piece to be used as if it were the game piece it is a placeholder for. As shown in FIG. 25, the game can indicate visually, such as with a halo 2500 shown around a game piece 2502 and/or text 2504 indicating the name of the game piece that the game piece is a placeholder for, that the game piece is being used as a placeholder to help remind players what the game piece is functioning as in the game.

Figure 26:
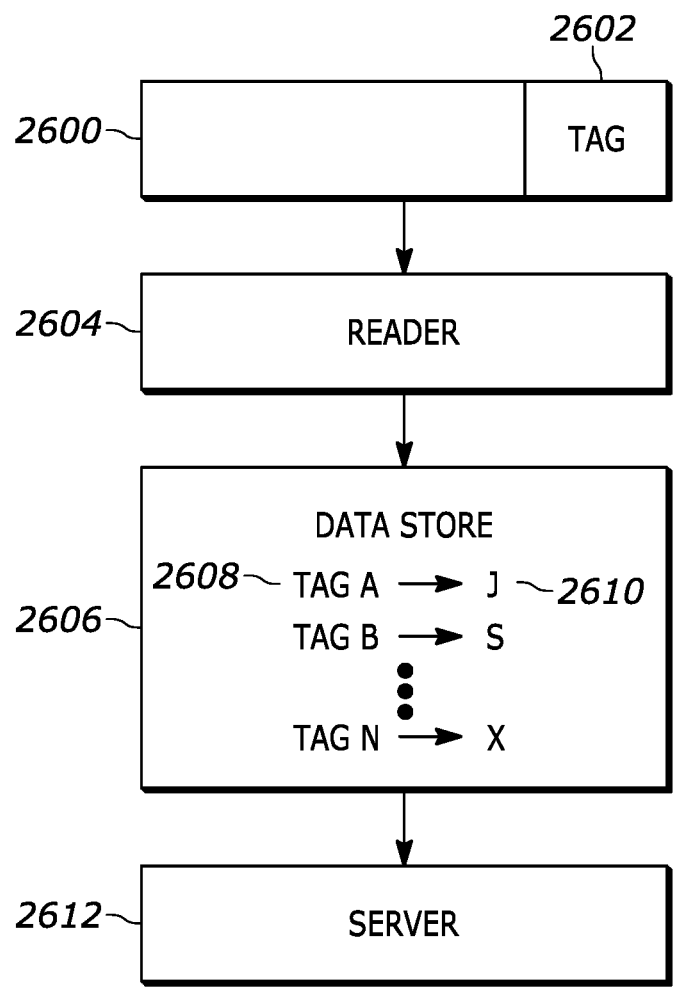
FIG. 26 illustrates tracking game pieces by owner.

FIG. 26 illustrates that a game system can detect who owns a particular game piece 2600 by its tracking tag 2602 such as through use of an RFID tag reader 2604 accessing a database 2606 correlating tags 2608 with owners 2610. This can be used to determine which player played a particular piece on the board, even if the pieces themselves look identical. This also facilitates networked game piece tracking in which the game system can track who the owner of a game piece is using a tracking system, such as a server 2612. In such an implementation, if the game piece owner used that game piece on a different board, the fact that a person is the owner of that piece could be obtained from the server. In some implementations, the game system can act as the tracking system, in which case the information it tracks about game pieces is only available when playing with those game pieces on that game system, or on a game system playing in a networked game session with that game system. In some implementations, block chain technology is used to track the status of game pieces, which may be virtual or may be physical, which may be implemented as a distributed block chain.

The tracking system may allow ownership of a tracked game piece to be transferred to another player within the game system. In some implementations, the tracking system may track the status of virtual game pieces, which may be in addition to tracking the status of physical game pieces. Such a game piece may be virtual and can be mapped to a physical game piece for game play. In some implementations, when using a virtual game piece, a player may map the virtual game piece to a physical game piece for use in game play.

In some implementations, the tracking system can track the state of a game piece that changes through game play, such as when the game piece levels up or when the game piece gains or uses resources through game play.

It will be appreciated that whilst present principals have been described with reference to some example embodiments, these are not intended to be limiting, and that various alternative arrangements may be used to implement the subject matter claimed herein.

What is claimed is:

1. A device comprising:
a game board substrate comprising a first surface on which game pieces can move; and
a grid of electromagnets (EM) juxtaposed with the substrate with at least first and second EM being individually addressable to cause at least one game piece to move on the substrate; and
at least one processor configured with instructions executable to control energization of the EM to:
cause at least a first game piece to move from a first location to a second location;
determine a path between the first and second locations to avoid collisions with other game pieces when the first game piece moves on the path from the first location to the second location.

2. The device of claim 1, wherein the first location is a current location of the first game piece and the second location is a demanded location of the first game piece.

3. The device of claim 1, wherein the processor is programmed with instructions to:
identify the first location at least in part using a camera that images the game board substrate.

4. The device of claim 1 wherein the processor is programmed with instructions to:
identify the first location at least in part using signals from a location receiver on the first game piece.

5. The device of claim 1, wherein the processor is programmed with instructions to:
identify the first location at least in part using a signal representing an electrical field generated by the first game piece being proximate to a deenergized EM.

6. The device of claim 1, wherein the processor is programmed with instructions to:
identify the first location at least in part using a magnetic field sensor.

7. The device of claim 1, wherein the processor is programmed with instructions to:
identify the first location at least in part using one or more signals generated by one or more sensor devices in the first game piece.

8. The device of claim 1, wherein the processor is programmed with instructions to:
move the first game piece on the game board at a first speed; and
move a second game piece on the game board at a second speed.

9. The device of claim 1, wherein the processor is programmed with instructions to:
energize and deenergize individual EMs or individual groups of EMs to pull the first game piece along the path.

10. The device of claim 1, wherein the processor is programmed with instructions to:
energize and deenergize individual EMs or individual groups of EMs to push the first game piece along the path.

11. The device of claim 1, comprising at least one processor configured with instructions to:
control the EM to flip the game piece from resting on a first surface to resting on a second surface.

12. The device of claim 1, comprising at least one processor configured with instructions to:
identify a calibration image of the game piece; and
correlate an optical location of the game piece to a location of the game piece relative to the EM grid at least in part using the calibration image.

13. The device of claim 1, wherein the game board substrate comprises a printed substrate.

14. The device of claim 1, wherein the game board substrate comprises a video display.

15. The device of claim 14, wherein the game board is configured to communicate with a computer game console or computer game server to receive computer game information from the console or server.

16. The device of claim 1, wherein the game piece is a smart game piece comprising at least one processor communicating via a wireless link with at least one processor of a component other than the game piece.

17. The device of claim 16, wherein the game piece comprises at least one magnet.

18. The device of claim 16, wherein the game piece comprises at least one motor configured for control by the processor of the game piece.

19. The device of claim 1, comprising at least one elevator configured to move the game piece onto the game board substrate.

20. The device of claim 1, comprising at least one robotic arm configured to move the game piece onto the game board substrate.

21. The device of claim 1, comprising at least one processor configured with instructions to:
identify initial locations of respective game pieces on the game board substrate; and
automatically move the game pieces from the initial locations to destination locations for game play.

22. The device of claim 1, comprising at least one processor configured with instructions to:
correlate respective game pieces with respective owners; and
disposing game pieces related to respective owners in respective regions of the game board substrate.

23. The device of claim 1, comprising at least one processor configured with instructions to:
determine a height of the game piece.

24. The device of claim 1, comprising at least one processor configured with instructions to:
responsive to a demanded game piece image, produce the game piece using 3D printing.

25. The device of claim 1, comprising at least one processor configured with instructions to:
identify a surrogate game piece for use in lieu of a demanded game piece; and
execute a game using the surrogate game piece in place of the demanded game piece.

26. A device comprising:
a game board substrate comprising a first surface on which game pieces can move; and
a grid of electromagnets (EM) juxtaposed with the substrate with at least first and second EM being individually addressable to cause at least one game piece to move on the substrate; and
at least one processor configured with instructions to:
identify that the game board substrate is tilted; and
responsive to identifying that the game board substrate is tilted, energize at least one EM to hold the game piece onto the game board.

27. A device comprising:
a game board substrate comprising a first surface on which game pieces can move; and a grid of electromagnets (EM) juxtaposed with the substrate with at least first and second EM being individually addressable to cause at least one game piece to move on the substrate; and at least one processor configured with instructions to:

identify a surrogate game piece for use in lieu of a demanded game piece;

execute a game using the surrogate game piece in place of the demanded game piece; and visibly indicate that the surrogate game piece is being used for the demanded game piece.

28. An assembly comprising:

a game board substrate on which at least a first game piece can move;

plural spaced-apart electromagnets (EM) juxtaposed with the game board substrate;

at least one processor programmed with instructions to:

selectively energize the EM to move the first game piece on the game board substrate;

identify a surrogate game piece for use in lieu of a demanded game piece;

execute a game using the surrogate game piece in place of the demanded game piece; and visibly indicate that the surrogate game piece is being used for the demanded game piece.

29. The assembly of claim 28, wherein the instructions are executable to:

control energization of the EM to cause the first game piece to move from a first location to a second location.

30. The assembly of claim 29, wherein the instructions are executable to:

identify the first location at least in part using a camera that images the game board substrate.

31. The assembly of claim 29, wherein the instructions are executable to:

identify the first location at least in part using signals from a device on the first game piece.

32. The assembly of claim 29, wherein the instructions are executable to:

identify the first location at least in part using a signal representing an electrical field generated by the first game piece being proximate to a deenergized EM.

33. The assembly of claim 28, wherein the instructions are executable to:

energize and deenergize individual EMs or individual groups of EMs to pull and/or push the first game piece on the game board substrate.

34. The assembly of claim 28, wherein the instructions are executable to control the EM to flip the game piece from resting on a first surface to resting on a second surface.

35. The assembly of claim 28, wherein the instructions are executable to:

identify a calibration image of the game piece; and correlate an optical location of the game piece to a location of the game piece relative to the EM grid at least in part using the calibration image.

36. The assembly of claim 28, wherein the game board substrate comprises a printed substrate.

37. The assembly of claim 28, wherein the game board substrate comprises a video display.

38. The assembly of claim 37, wherein the game board is configured to communicate with a computer game console or computer game server to receive computer game information from the console or server.

39. The assembly of claim 28, wherein the game piece is a smart game piece comprising at least one processor communicating via a wireless link with at least one processor of a component other than the game piece.

40. The assembly of claim 39, wherein the game piece comprises at least one magnet.

41. The assembly of claim 39, wherein the game piece comprises at least one motor configured for control by the processor of the game piece.

42. The assembly of claim 28, comprising at least one elevator configured to move the game piece onto the game board substrate.

43. The assembly of claim 28, comprising at least one robotic arm configured to move the game piece onto the game board substrate.

44. The assembly of claim 28, comprising at least one processor configured with instructions to:

identify initial locations of respective game pieces on the game board substrate; and automatically move the game pieces from the initial locations to destination locations for game play.

45. The assembly of claim 28, comprising at least one processor configured with instructions to:

correlate respective game pieces with respective owners; and disposing game pieces related to respective owners in respective regions of the game board substrate.

46. The assembly of claim 28, comprising at least one processor configured with instructions to:

determine a height of the game piece.

47. The assembly of claim 28, comprising at least one processor configured with instructions to:

responsive to a demanded game piece image, produce the game piece using 3D printing.

48. An assembly comprising:

a game board substrate on which at least a first game piece can move;

plural spaced-apart electromagnets (EM) juxtaposed with the game board substrate;

at least one processor programmed with instructions to:

selectively energize the EM to move the first game piece on the game board substrate;

control energization of the EM to cause the first game piece to move from a first location to a second location; and determine a path between the first and second locations to avoid collisions with other game pieces when the first game piece moves on the path from the first location to the second location.

49. An assembly comprising:

a game board substrate on which at least a first game piece can move;

plural spaced-apart electromagnets (EM) juxtaposed with the game board substrate;

at least one processor programmed with instructions to:

identify that the game board substrate is tilted; and responsive to identifying that the game board substrate is tilted, energize at least one EM to hold the game piece onto the game board.

* * * * *